(12) United States Patent
Ostojic et al.

(10) Patent No.: US 7,761,812 B2
(45) Date of Patent: Jul. 20, 2010

(54) MEDIA USER INTERFACE GALLERY CONTROL

(75) Inventors: Bojana Ostojic, Kirkland, WA (US);
Christopher A Glein, Seattle, WA (US);
Mark R. Gibson, Seattle, WA (US);
William H Vong, Redmond, WA (US);
William T Flora, Seattle, WA (US);
Benjamin N Alton, Redmond, WA (US);
Mark S Newell, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 812 days.

(21) Appl. No.: 11/215,315

(22) Filed: Aug. 30, 2005

(65) Prior Publication Data
US 2007/0028267 A1 Feb. 1, 2007

Related U.S. Application Data

(60) Provisional application No. 60/703,023, filed on Jul. 27, 2005.

(51) Int. Cl.
*G06F 3/048* (2006.01)
*G06F 3/00* (2006.01)
*G06F 3/16* (2006.01)

(52) U.S. Cl. .................. 715/835; 715/716; 715/719; 715/727; 715/730; 715/764; 715/767; 715/810; 715/828; 715/829; 715/830; 715/834; 715/838; 725/37; 725/39; 725/52

(58) Field of Classification Search .................. 715/716, 715/719, 727, 730, 764, 767, 810, 828, 829, 715/830, 834, 835, 838; 725/37, 39, 52
See application file for complete search history.

(56) References Cited

U.S. PATENT DOCUMENTS

| 5,485,197 | A | * | 1/1996 | Hoarty ..................... 725/37 |
| 5,530,754 | A | | 6/1996 | Garfinkle |
| 6,118,450 | A | * | 9/2000 | Proehl et al. ............ 715/810 |
| 6,133,914 | A | | 10/2000 | Rogers et al. |

(Continued)

OTHER PUBLICATIONS

International Search Report Application No. 06/29298 Mailed on Sep. 17, 2007, pp. 6.

(Continued)

*Primary Examiner*—Steven P Sax
*Assistant Examiner*—Grant D Johnson
(74) *Attorney, Agent, or Firm*—Lee & Hayes, PLLC

(57) ABSTRACT

Outputting a user interface having a list of a plurality of representations of media items on a display of a computing device is presented. In one embodiment, a center locking region (CLR) is defined in the user interface and covers a portion of the plurality of representations, wherein navigation from a first representation within the CLR to a second representation outside the CLR causes a scrolling of the second representation into the CLR on one horizontal side and a scrolling of a third representation within the CLR out of the CLR on the other horizontal side while navigation through a portion of the plurality of representations within the CLR causes no scrolling. In another embodiment, a gap indicating a beginning and an end of the list is displayed and a scrolling occurs when the gap is within the CLR and a horizontal navigation within the CLR is performed.

14 Claims, 27 Drawing Sheets

U.S. PATENT DOCUMENTS

| | | | |
|---|---|---|---|
| 6,184,884 B1* | 2/2001 | Nagahara et al. | 715/828 |
| 6,397,387 B1 | 5/2002 | Rosin et al. | |
| 6,515,656 B1 | 2/2003 | Wittenburg et al. | |
| 6,678,891 B1* | 1/2004 | Wilcox et al. | 725/42 |
| 6,728,753 B1 | 4/2004 | Parasnis et al. | |
| 6,757,906 B1 | 6/2004 | Look et al. | |
| 6,828,992 B1 | 12/2004 | Freeman et al. | |
| 6,876,397 B2* | 4/2005 | Funakoshi et al. | 348/569 |
| 6,883,146 B2 | 4/2005 | Prabhu et al. | |
| 7,036,091 B1* | 4/2006 | Nguyen | 715/834 |
| 7,051,282 B2 | 5/2006 | Marcjan | |
| 7,055,104 B1* | 5/2006 | Billmaier et al. | 715/765 |
| 7,091,998 B2* | 8/2006 | Miller-Smith | 715/810 |
| 7,127,679 B2 | 10/2006 | Cohen | |
| 7,219,076 B1 | 5/2007 | Racine | |
| 7,228,556 B2 | 6/2007 | Beach et al. | |
| 7,493,647 B2 | 2/2009 | White et al. | |
| 7,600,194 B2 | 10/2009 | DeMaio et al. | |
| 2001/0033296 A1 | 10/2001 | Fullerton et al. | |
| 2002/0112180 A1 | 8/2002 | Land et al. | |
| 2002/0140805 A1 | 10/2002 | Gutta et al. | |
| 2002/0196268 A1 | 12/2002 | Wolff et al. | |
| 2003/0101230 A1 | 5/2003 | Benschoter et al. | |
| 2003/0112467 A1 | 6/2003 | McCollum et al. | |
| 2003/0140346 A1 | 7/2003 | Maa | |
| 2003/0234819 A1 | 12/2003 | Daly et al. | |
| 2004/0221308 A1 | 11/2004 | Cuttner et al. | |
| 2004/0250278 A1 | 12/2004 | Imai et al. | |
| 2004/0252119 A1 | 12/2004 | Hunleth et al. | |
| 2004/0268413 A1 | 12/2004 | Reid et al. | |
| 2005/0097601 A1 | 5/2005 | Danker et al. | |
| 2005/0108752 A1* | 5/2005 | Nishikawa et al. | 725/39 |
| 2005/0125826 A1* | 6/2005 | Hunleth et al. | 725/45 |
| 2005/0132293 A1 | 6/2005 | Herberger et al. | |
| 2005/0149551 A1 | 7/2005 | Fong et al. | |
| 2005/0188314 A1 | 8/2005 | Matthews et al. | |
| 2005/0235209 A1* | 10/2005 | Morita et al. | 715/716 |
| 2005/0257166 A1 | 11/2005 | Tu | |
| 2005/0278656 A1* | 12/2005 | Goldthwaite et al. | 715/810 |
| 2006/0015818 A1 | 1/2006 | Chaudhri et al. | |
| 2006/0026529 A1 | 2/2006 | Paulsen et al. | |
| 2006/0224962 A1 | 10/2006 | Ostojic et al. | |
| 2006/0248470 A1 | 11/2006 | Lee et al. | |
| 2007/0011623 A1 | 1/2007 | Billmaier et al. | |
| 2008/0163090 A1 | 7/2008 | Cortright | |

OTHER PUBLICATIONS

"AL Pictures Slideshow Studio", From the Internet: http://www.aptrio.com/Business-Presentation-Tools/al-pictures-slideshow-studio-business-license-7684.html.

"Kalibrate", From the Internet: http://www.kalibratecms.com/public/QIXDL534234243.aspx.

* cited by examiner

MEDIA USER INTERFACE GALLERY CONTROL

RELATED APPLICATIONS

The present application claims priority under 35 U.S.C. §119(e) to U.S. Provisional Patent Application No. 60/703,023, filed Jul. 27, 2005 and titled "Media User Interface", the entire disclosure of which is hereby incorporated by reference in its entirety.

BACKGROUND

Users have access to a wide variety of different types of media via a wide variety of devices. For example, a user may watch a television program via a traditional television set, order pay-per-view (PPV) and video on demand (VOD) programming via a set-top box, play video games using a game console, read and respond to email and instant messages using a desktop personal computer (PC), listen to songs using a digital music player, watch streaming video via a wireless phone, schedule appointments on a personal digital assistant (PDA), and so on. However, as the variety of media types and devices continued to increase, users were typically confronted with the need to use different devices to access the different media types, which may be both inconvenient and frustrating.

To limit user frustration, traditional techniques were employed to make a variety of media types available via a single device. Therefore, a user of the device may interact with the variety of media types without having to switch devices. However, these traditional techniques may also be cumbersome when interacting with the media. For example, a traditional technique for navigating between media items may be optimized for a particular type of media item, and therefore may not be suited for other types of media items. Additionally, the traditional technique may not be suited for the large number of media items that are currently available to a user, such as to interact with hundreds of movies, thousands of songs, and so on.

SUMMARY

A media user interface is described. In one or more implementations, a media user interface is configured in layers such that a media item (e.g., a movie) and the user interface are displayable concurrently. Therefore, a user of the media user interface may continue to view the media item (e.g., the movie) while interacting with the user interface and without leaving the current consumption mode, e.g., viewing the movie. Additionally, the media user interface may be configured to be context sensitive to the media item being displayed, such as to offer features that are relevant to the media item.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

Figure 1:
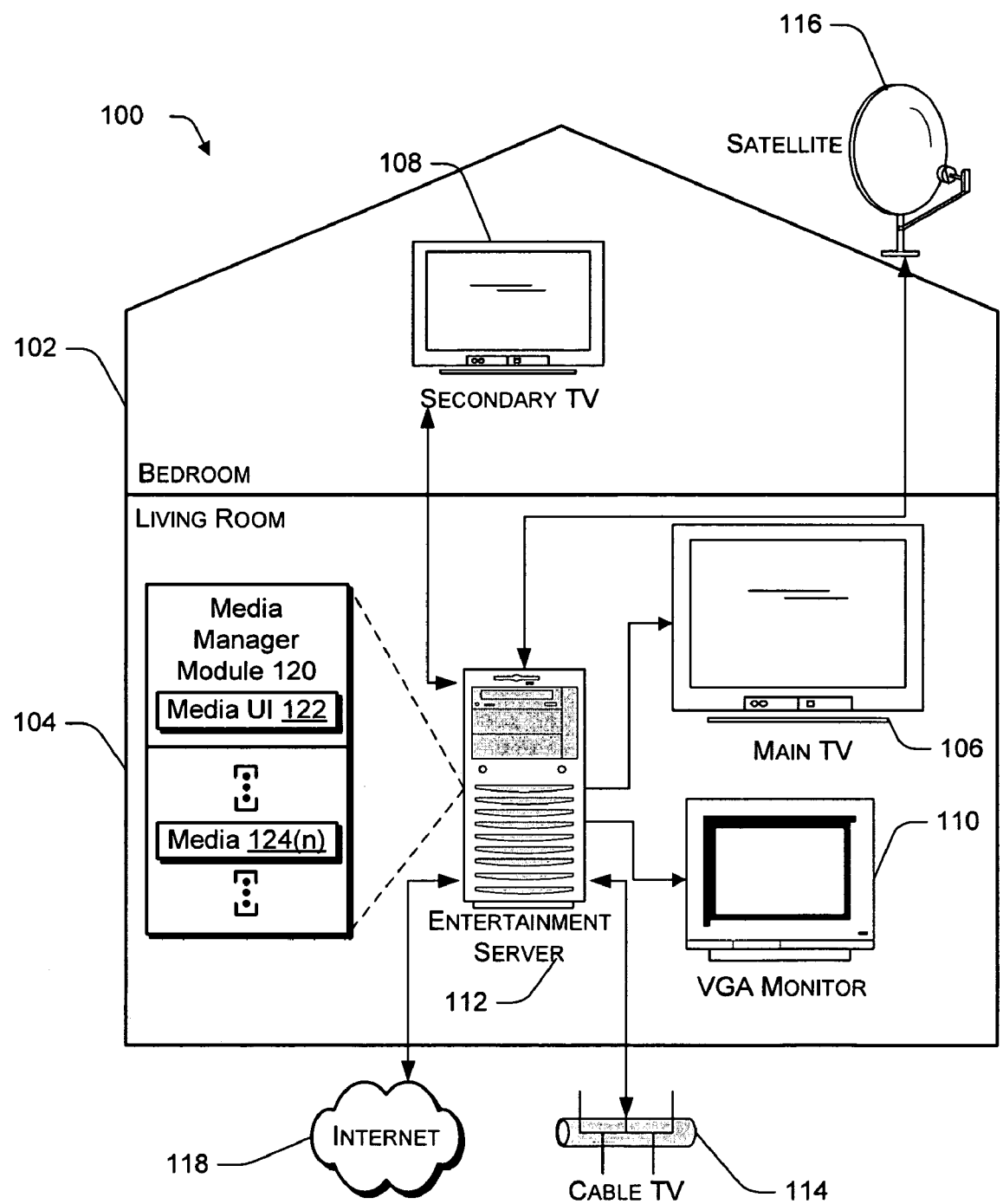
FIG. 1 is an illustration of an exemplary environment operable to provide a media user interface.

Media user interfaces and systems which employ media user interfaces are described. In an implementation, a media user interface is provided through a system to include distinct areas of experience: browse, manage and consume. Each of these experiences is optimized for a particular set of functionality that fits into each area and each is built too appropriately cross-link, one to another. The system, for instance, may employ media user interface which includes overlays that operate as main "pages", with which, a user interacts with and chooses features from, as opposed to traditional techniques which focused on dialog and notification boxes. Therefore, these traditional techniques forced the user to "leave" the current consumption experience, e.g., to watch a movie, listen to a song, and so on.

Additionally, display of the overlays may be dependent on a context of a consumption experience, such as media items currently being displayed, previous actions taken and their interactivity, and so on. For example, when a "Details" page is displayed as an overlay, the details of a current media item being output and features to interact with the current media item that are relevant to the media item are displayed, such as photo editing features and origination date for an image, artist information for a song, and so forth. Further discussion of overlays and context sensitivity may be found in relation to FIGS. 3-7 and 21-22.

In additional implementations, left/right media navigation is described. While tradition navigation techniques follow web-like vertical navigation through pages and content, in these implementations a shift has been made to leverage both horizontal as well as vertical space. This is reflected in a variety of places in the interactive model of the media user interface, such as in a "Start Menu", "Gallery", "Details", "Now Playing" menu, and so on. Further discussion of left/right navigation techniques may be found in relation to FIGS. 8-11 and 23-24.

In further implementations, a media user interface is configured to include a gallery control to present content. The gallery control may provide a variety of functionality. For example, a center-locking region may be employed that "center locks" representations (e.g., tiles) in the gallery view. Once the user tries to navigate "out" of that region, the tiles scroll horizontally, e.g., left to right and vice versa. Additionally, the gallery may be configured as a carousel that wraps through the media UI such that navigation in a single direction may be utilized to access each representation in that carousel. Further, since the gallery view wraps, a gap may be employed between the "beginning" and the "end" of the gallery such that a user may be readily informed as to where a represented list begins and ends. Yet further, the "gap" between the ends of the list may be handled such that the center-locking region may be maintained with minimal processing. Additionally, pivots may be used to sort media items. Further discussion of a gallery control may be found in relation to FIGS. 12-18 and 24.

In yet further implementations, a media user interface configured as a start menu is described. In an example of the start menu, representations (e.g., partners tiles) may be provided if the respective services are registered, and the representations may be positioned in a variety of ways. For instance, if there is more than one service registered, a "more programs" tile may be used to represent these services (for instance, priority may be given to a particular partner to the "left" while other partners are accessible through the "More Programs" tile). In another example, "back-stack trimming" of a user's navigation history may be performed such that a single instance of a menu is preserved in the back stack, with each other instance being ignored/deleted. In a further example, a categorized view of applications and media items may be employed in which installed applications and media are assigned a category and are presented in a categorized view. Yet further, for the media items that do not have preconfigured representations, text may be incorporated to create a representation. Further discussion of a start menu and other described functionality may be found in relation to FIGS. 19-20 and 25-27.

In the following discussion, an exemplary environment is first described which is operable to employ a media user interface. Exemplary user interfaces are then described which may be employed in the exemplary environment, as well as in other environments.

Exemplary Environment

FIG. 1 shows an exemplary home environment 100 including a bedroom 102 and a living room 104 which is operable to employ a media user interface. Situated throughout the home environment 100 is a plurality of monitors, such as a main TV 106, a secondary TV 108, and a VGA monitor 110. Media items may be supplied to each of the monitors 106, 108, 110 over a home network from an entertainment server 112 situated in the living room 104. In one implementation, the entertainment center 112 is a conventional personal computer (PC) configured to run a multimedia software package, such as, for example, the Windows® XP Media Center™ (WINDOWS and MEDIA CENTER are trademarks of the Microsoft Corporation, Redmond, Wash.) edition operating system marketed by the Microsoft Corporation. In such a configuration, the entertainment center 112 is able to integrate full computing functionality with a complete home entertainment system into a single PC. For instance, a user can watch TV in one graphical window of one of the monitors 106, 108, 110 while sending email or working on a spreadsheet in another graphical window on the same monitor. In addition, the entertainment system may also include other features, such as, for example:

A Digital Video Recorder (DVR) to capture live TV shows for future viewing or to record the future broadcast of a single program or series.

DVD playback.

An integrated view of the user's recorded content, such as TV shows, songs, pictures, and home videos.

A 14-day EPG (Electronic Program Guide).

In addition to being a conventional PC, the entertainment server 112 may also be configured as a variety of other computing devices including, for example, a notebook computer, a tablet PC, a server, or any consumer-electronics device capable of rendering a media component.

With the entertainment server 112, a user may watch and control live television received, for example, via cable 114, satellite 116 and/or an antenna (not shown for the sake of graphic clarity), and/or a network such as the Internet 118. This capability is enabled by a tuner residing in the entertainment server 112. It will also be understood, however, that the tuner may be located remote from the entertainment server 112 as well. In both cases, the user may choose a tuner to fit any particular preferences. For example, a user wishing to watch both standard and HD content should employ a tuner configured for both types of contents. Since the entertainment server 112 may be a full function computer running an operating system, the user may also have the option to run standard computer programs (word processing, spreadsheets, and so on), send and receive emails, browse the Internet, or perform other common functions.

The entertainment server 112 is also illustrated as having a media manager module 120 which is executable to provide a media user interface (UI) 122 to interact with a plurality of media 124($n$), where "n" can be any integer from one to "N". As previously described, the plurality of media 124($n$) items may be obtained from a variety of sources and be configured as a variety of different types. Accordingly, the media manager module 120, when executed, may provide the media UI 122 such that a user of the entertainment server may interact with the plurality of media 124($n$), such as to navigate to a particular media item of interest, utilize features provided by the media manager module 120 related to media interaction (e.g., edit, store, search, and so on), obtain media 124($n$), and so forth. Further discussion of execution of the media manager module 120 and output of the media UI 122 may be found in relation to the following figure.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the media user interface techniques described below are platform-independent, meaning that the techniques may be implemented on a variety of commercial computing platforms having a variety of processors.

Figure 2:
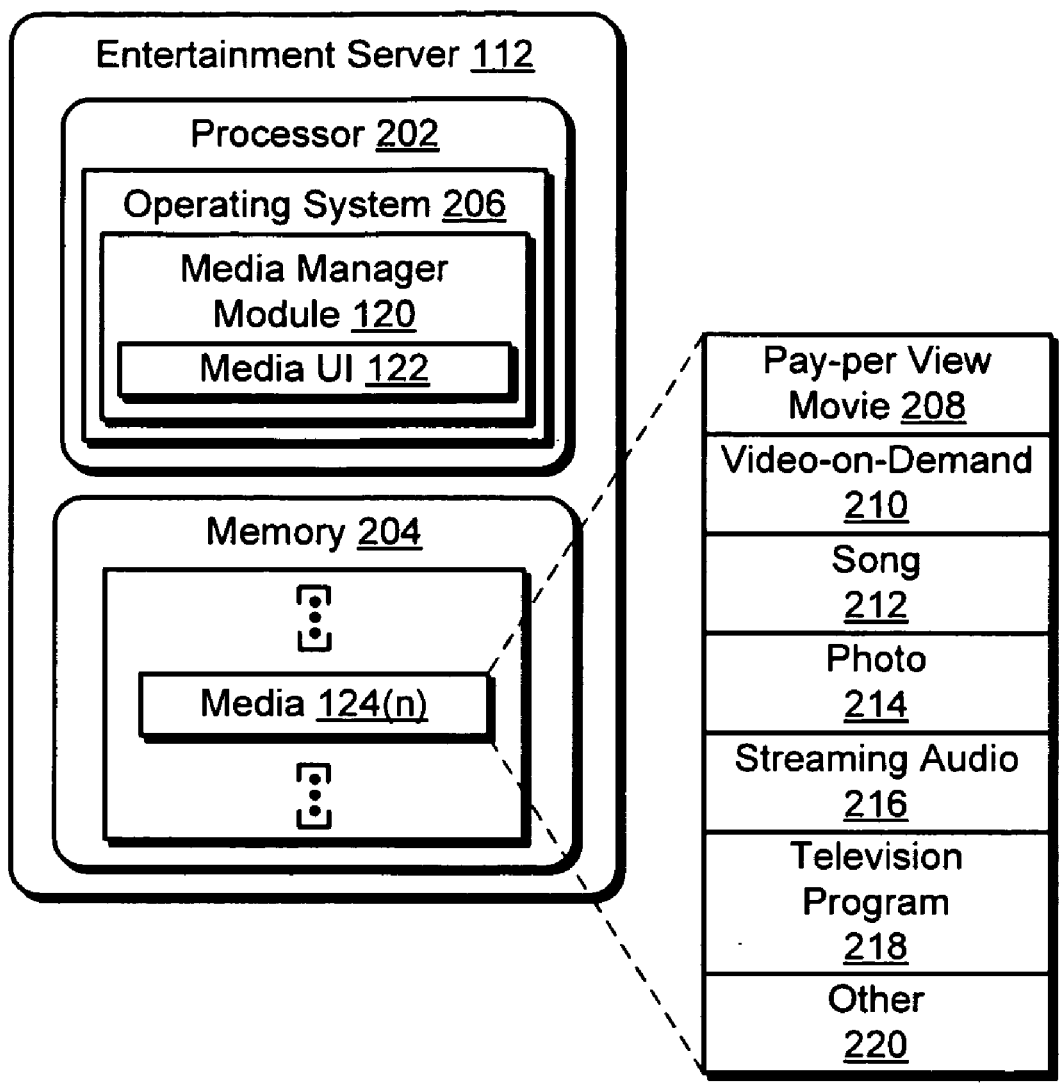
FIG. 2 is an illustration of an exemplary implementation showing the entertainment server of FIG. 1 in greater detail.

FIG. 2 illustrates an exemplary embodiment 200 of the entertainment server 112 of FIG. 1 in greater detail. The entertainment server 112 includes a processor 202 and memory 204. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 204 is shown for the entertainment server 112, a wide variety of types and combinations of memory may be employed, such as random access memory (RAM), hard disk memory, removable medium memory, and other types of computer-readable media.

The media manager module 120 is illustrated as being executed on the processor 202 and is storable in memory 204. The media manager module 120 is representative of functionality that is executable to manage the plurality of media 124($n$) accessible on the entertainment server 112. The media manager module 120 may be implemented in a variety of ways, such as a stand-alone module or included in part of other executable modules, such as an operating system 206 as illustrated. A variety of other examples are also contemplated.

As previously described, the entertainment server 112 may be utilized to interact with a variety of different types of media 124($n$). For example, the media 124($n$) may be configured as a pay-per-view movie 208, video-on-demand 210, a song 212 (e.g., an MP3 song), a photo 214 (e.g., a digital photo), streaming audio 216 (e.g., satellite radio), a television program 218, and other 220 types of media. Although the plurality of media 124($n$) is illustrated as stored in the memory 204, the media 124($n$) may also be managed which is obtained from "outside" the entertainment server 112, e.g., over the internet 118 of FIG. 1 and so on. A variety of techniques may be employed to interact with the media through the media UI 122 provided by the media manager module 120, further discussion of which may be found in relation to the following figures.

Exemplary User Interfaces

FIGS. 3-20 are illustrations of exemplary media user interfaces. The media user interfaces may be configured to provide a wide variety of functionality, such as layers and overlays, left/right navigation, gallery control, a start menu, and so on, further discussion of which may be found in relation to the following sections, respectively.

Layers and Overlays

Figure 3:
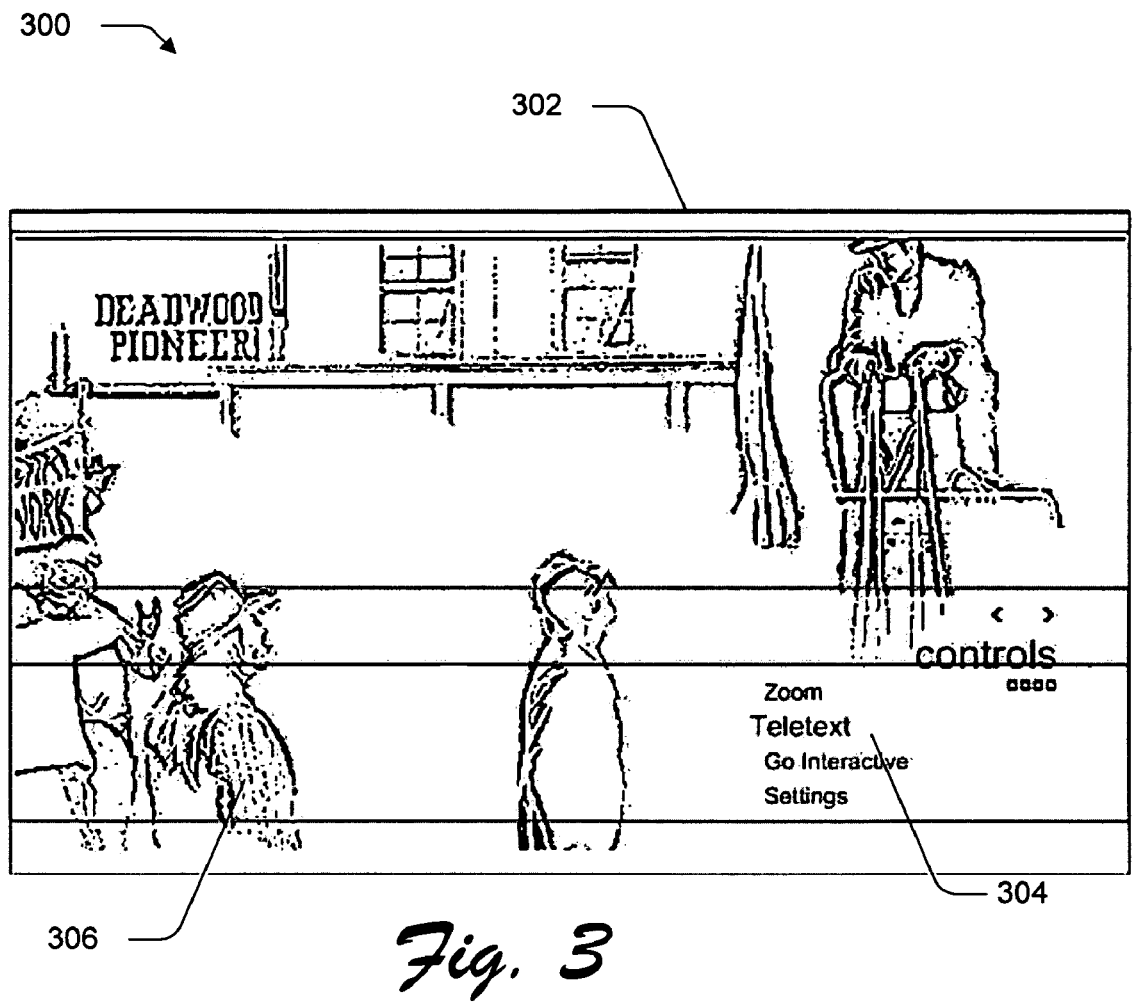
FIG. 3 is an illustration of an exemplary implementation showing concurrent display of a media item configured as a television program with a media user interface configured to provide features related to the media item.

Reference will now be made generally to FIGS. 3-7, which illustrate exemplary media UIs that are displayed concurrently as an overlay over a media item. FIG. 3 illustrates an exemplary implementation 300 of concurrent display of a media item configured as a television program with a media UI configured to provide features related to the media item. In the illustrated implementation, the media item 302 is the television program "Deadwood" as displayed on a display device, such as a television.

Displayed "over" the media item 302 is a media UI 304 that includes features (e.g., controls) that relate to the media item 302, which in this instance are illustrated as "zoom", "teletext", "go interactive" and "settings". As illustrated, the media UI 304 overlays the media item 302 (e.g., the television program) such that the substantial portions of the television program are still viewable "through" the media UI 304. The media item 302 in this instance substantially occupies the available display area of a display device, i.e., the media item 302 is displayed to occupy available dimensions (e.g., height and width) available to display media.

In the illustrated implementation, the media UI 304 is substantially translucent such that portions of the display device output both the media UI 304 and the media item 302. In the illustrated instance, non-textual portions of the media UI 304 are sufficiently translucent such that a user may view the media item 302 as well as features (e.g., "zoom", "go interactive", and so on) available via the media UI. The textual portions of the media UI 304, as well as features and indications of available features (e.g., the "arrows" above the text "controls", further discussion of which may be found in relation to the Left/Right Navigation Section) are configured to be viewed over the media item 302. Other portions 306 of the media item 302 are viewable directly, e.g., by providing transparent portions of the media UI 304, by limiting the media UI to specific portions of a display device, and so on.

As discussed previously, the configuration of media UIs as an overlay allows the functionality provided by the media UI to be accessed while the user consumes a media item, e.g., a song, television program, and so on. Thus, the media UIs may be provided without the use of traditional pages which requires navigation "away" from a current consumption experience, e.g., to a separate page.

Figure 4:
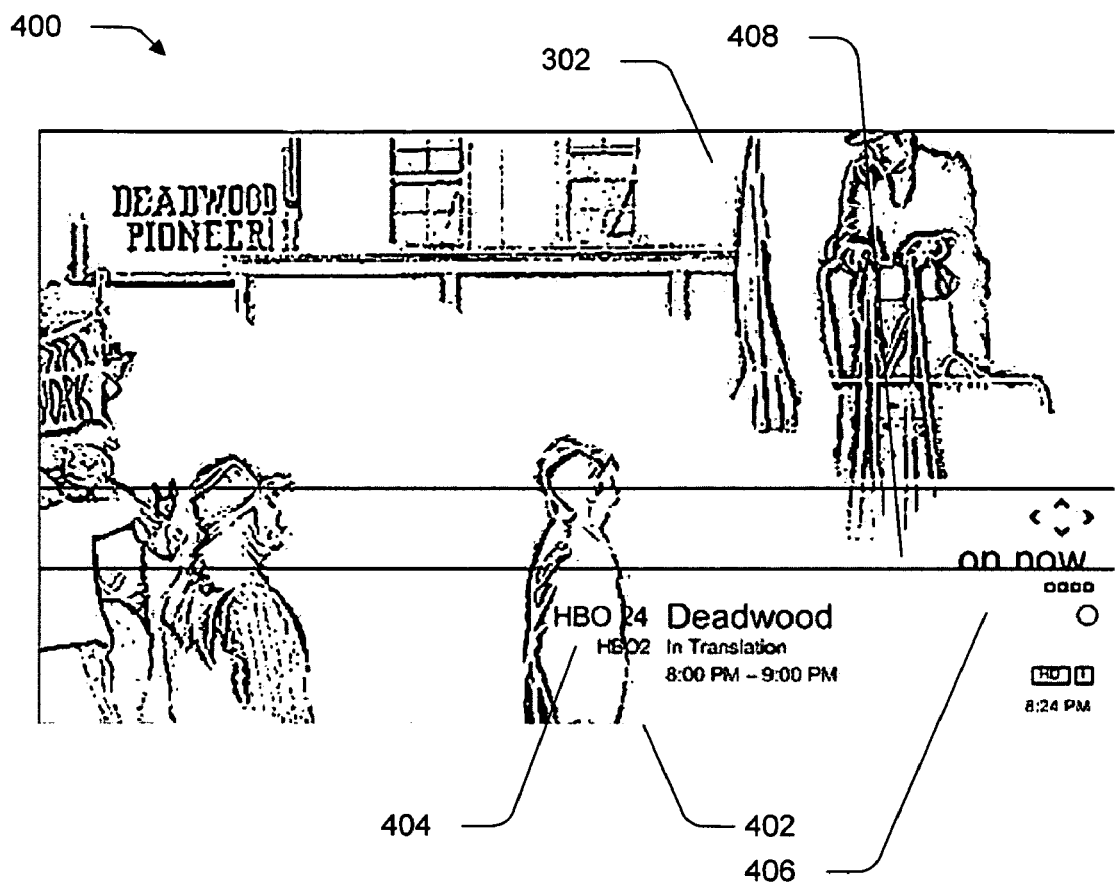
FIG. 4 is an illustration of a media user interface in an exemplary implementation in which a detail view is shown.

For example, FIG. 4 illustrates a media UI in an exemplary implementation 400 in which a detail view is shown. The "detail view" 402 as illustrated is an overlay that may be displayed anytime and at any point during consumption of a media item. In the illustrated detail view 402, details of consumption of the media item 302 are displayed, such as a particular channel 404, relative point in the output of the media item 406, an indication 408 that the media item 302 is "on now" (i.e., is currently being streamed to the entertainment server 112 as opposed to being output from a recording in a DVR), and so on.

Because the detail view can be displayed at anytime and at any point during consumption of a media item, it may also be made context sensitive. For example, as shown in FIG. 4, the media UI 402 includes features that relate to the media item 302 being displayed. Context sensitivity may also be provided for a wide variety of different overlays of a media UI.

Figure 5:
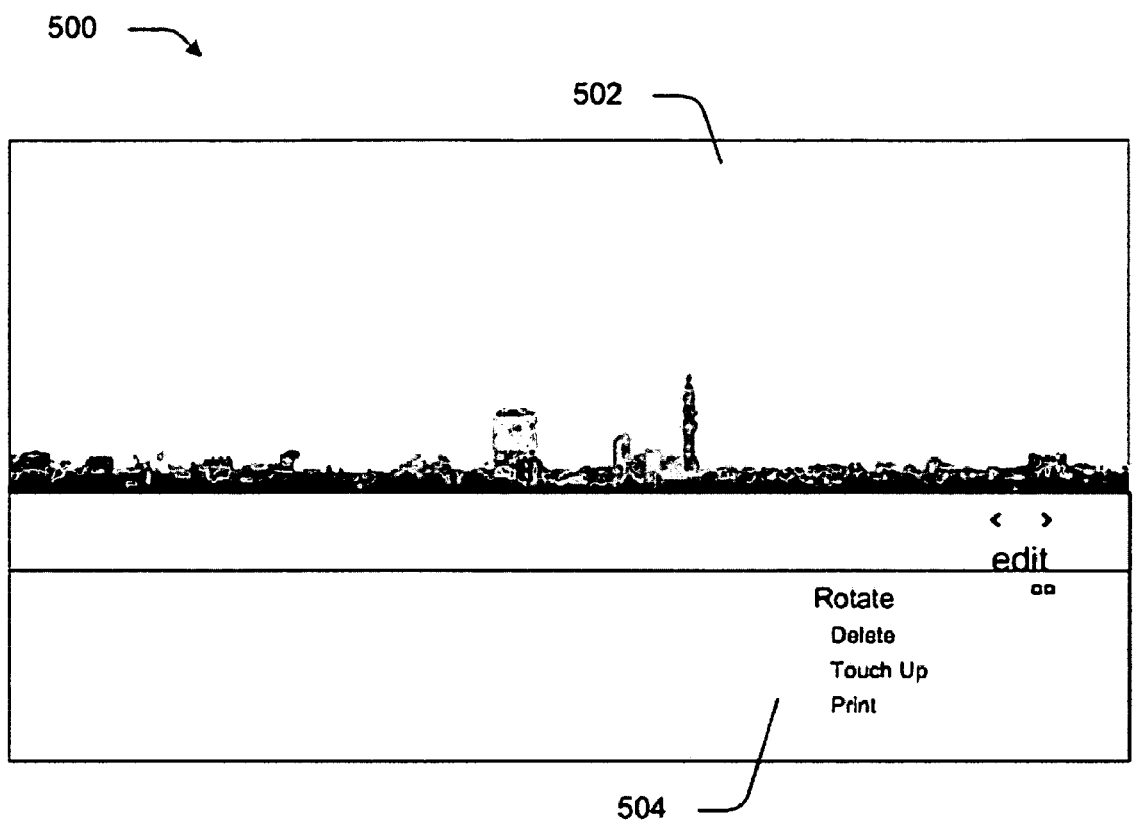
FIG. 5 is an illustration of an exemplary implementation showing a media user interface which provides editing features to a media item configured as an image, such as a digital photo.

FIG. 5 illustrates an exemplary implementation 500 of a media UI which provides editing features to a media item configured as an image. In the illustrated implementation 500, the media item 502 is configured as a digital photo, over which, the media UI 504 is displayed. The media UI 504 includes features which relate to the media type (e.g., image) of the media item 502, which in this instance is an editing overlay that includes the features "rotate", "delete", "touch up" and "print". Thus, the user may interact with these features without leaving the current consumption mode, e.g., viewing the media item.

Figure 6:
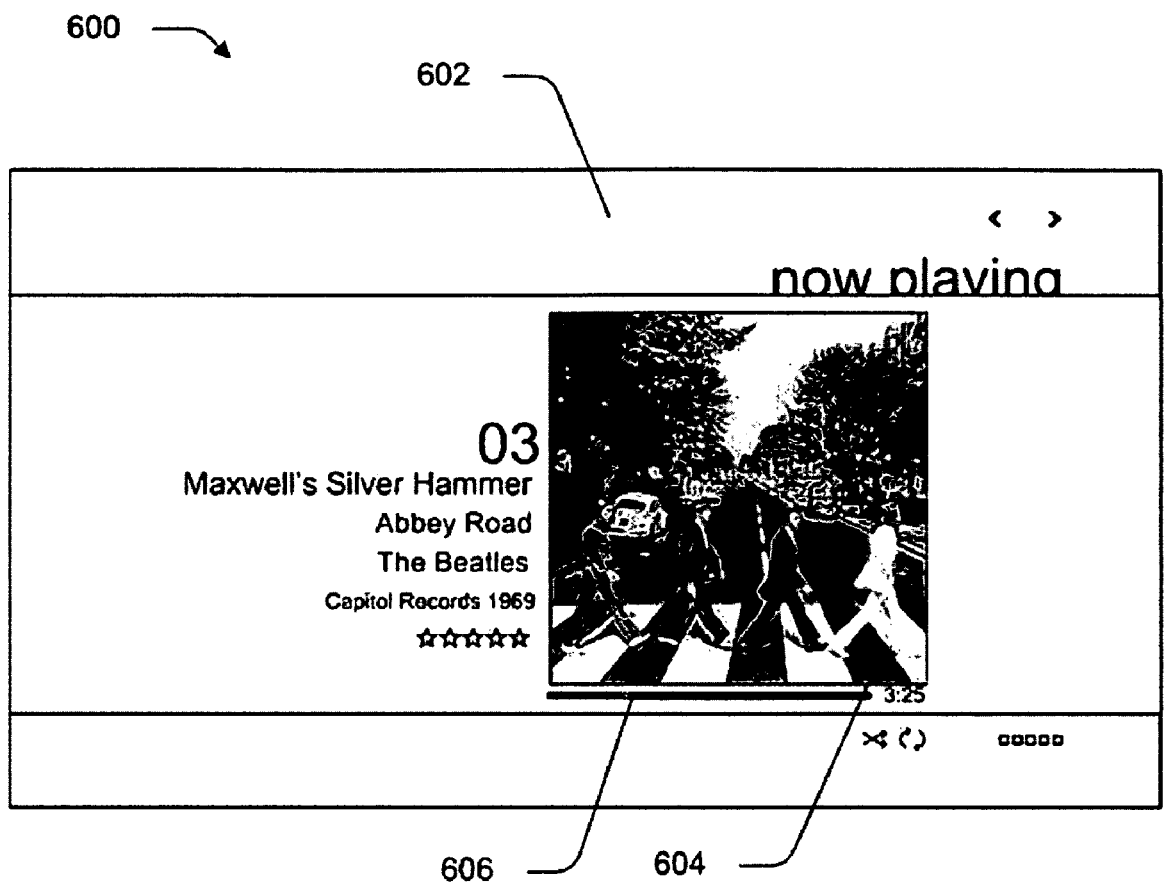
FIG. 6 is an illustration of an exemplary implementation in which an audio media item is output concurrently with a media user interface.

Concurrent display of data related to the media item and the media user interface is not limited to visual media types. FIG. 6, for instance, illustrates an exemplary implementation in which an audio media item is output concurrently with a media UI 602. The media UI 602 is illustrated as a "now playing" overlay for an audio item and also displays details related to the media item, such as song name (e.g., Maxwell's Silver Hammer), album (e.g., Abbey Road), artist (e.g., the Beatles), album art 604, output status bar 606, and so on.

Context sensitivity may also be provided to provide features based on a state and type of a media item. For example, the user may navigate to a music library and select play of the media item as shown in FIG. 6. Now that the user (and more particular the media UI 602) is in the "playing" stage, the user may wish to listen to additional songs after that song by forming a playlist, further discussion of which may be found in relation to the following figure.

Figure 7:
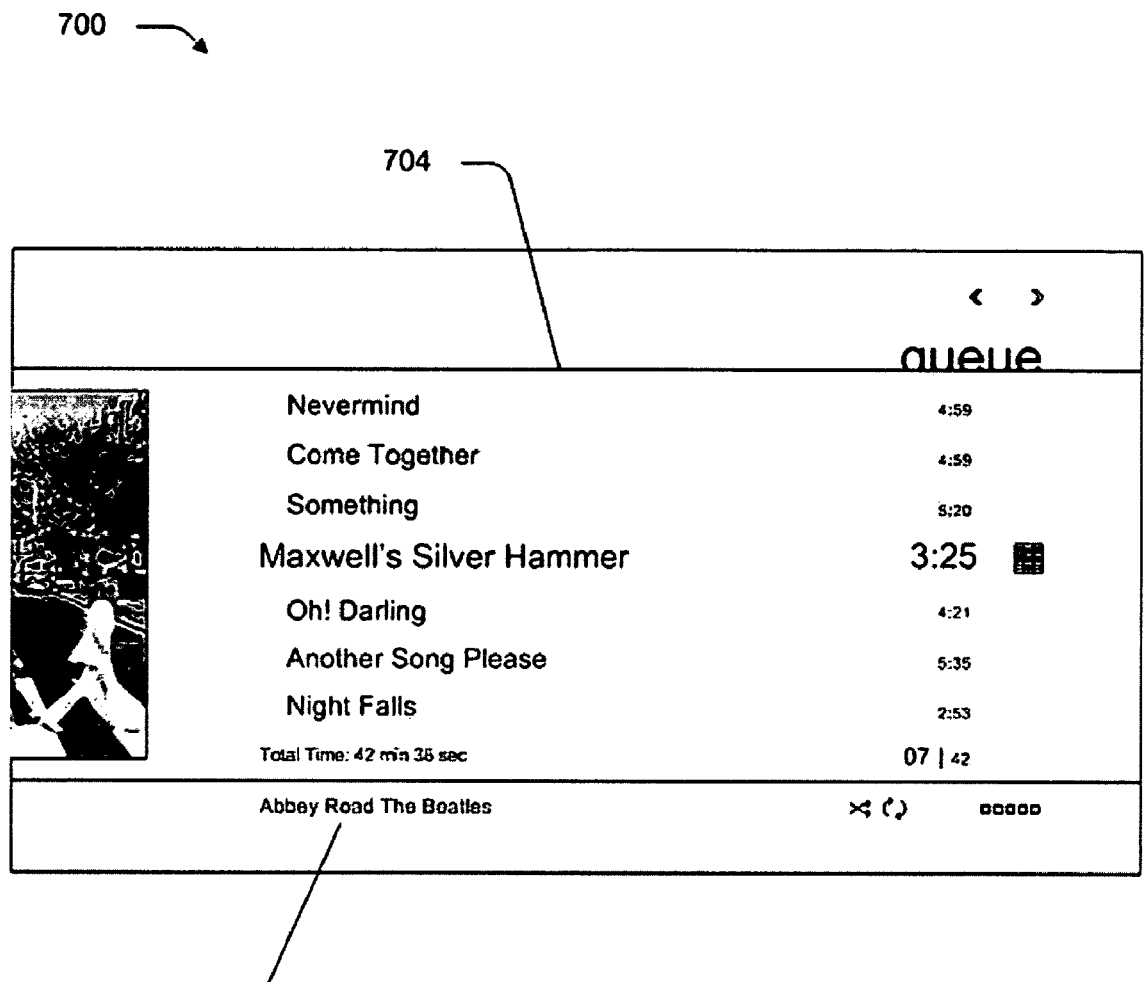
FIG. 7 is an illustration of an exemplary implementation showing selection of additional media items to be added to a queue during output of the media item of FIG. 6.

FIG. 7 illustrates an exemplary implementation 700 showing selection of additional media items to be added to a queue during output of the media item of FIG. 6. When selected by the user (e.g., upon receipt of an input from an input device), the details page is displayed as an overlay and logic is used to "add to queue". Thus, the media manager module 120 may include logic that determines that the feature "add to queue" is to be provided instead of the feature "play". Therefore, once a media item has begun rendering, the focus is provided automatically by the media manager module 120 to "add to queue." When the user selects one of the media items in the "add to queue" overlay, an animation may show the album cover (or other representation) as being transported "down" to the "now playing" area 702 of the media UI 704. Thus the user is not forced to navigate to different pages as required by traditional techniques, such as select a destination (e.g., album page), select "add to queue" and then select "back" to return back to the song list and then repeat this process for each additional media item. Rather, through the use of overlays, the user is left in context of the media items for selection (e.g., a "gallery", further discussion of which may be found in relation to the following sections) and therefore the user may continue to add songs while remaining in the context of the songs.

For example, suppose a user is listening to a song and wants to learn additional information about the song. When the user selects a "more info" button on a remote control, the media manager may bring up the song detail as an overlay. Again, the user was not forced to leave this context, and now can learn more about items being rendered in that context. When the user selects "back", the user may return to playing. Similar functionality may be provided in the terms of watching television program. Thus, the media UI may display media contextually in relation to a previous action taken. Further discussion of context sensitivity and overlay may be found in relation to the exemplary procedures 2100 and 2200 of FIGS. 21 and 22, respectively.

Left/Right Navigation

Lists of media items for navigation are not traditionally ordered horizontally left-to-right. In a traditional web page, for instance, navigation is provided as generally oriented "up/down". Therefore, when a user is confronted with a large collection of media items, the user may be required to navigate through a large portion of the collection to locate a particular media item of interest. Additionally, this navigation may involve a significant amount of time and/or number of inputs from the user to perform the navigation. In the present implementation, however, "left/right" navigation techniques are provided, such as to navigate through representations of media items and lists to efficiently locate items of interest.

Figure 8:
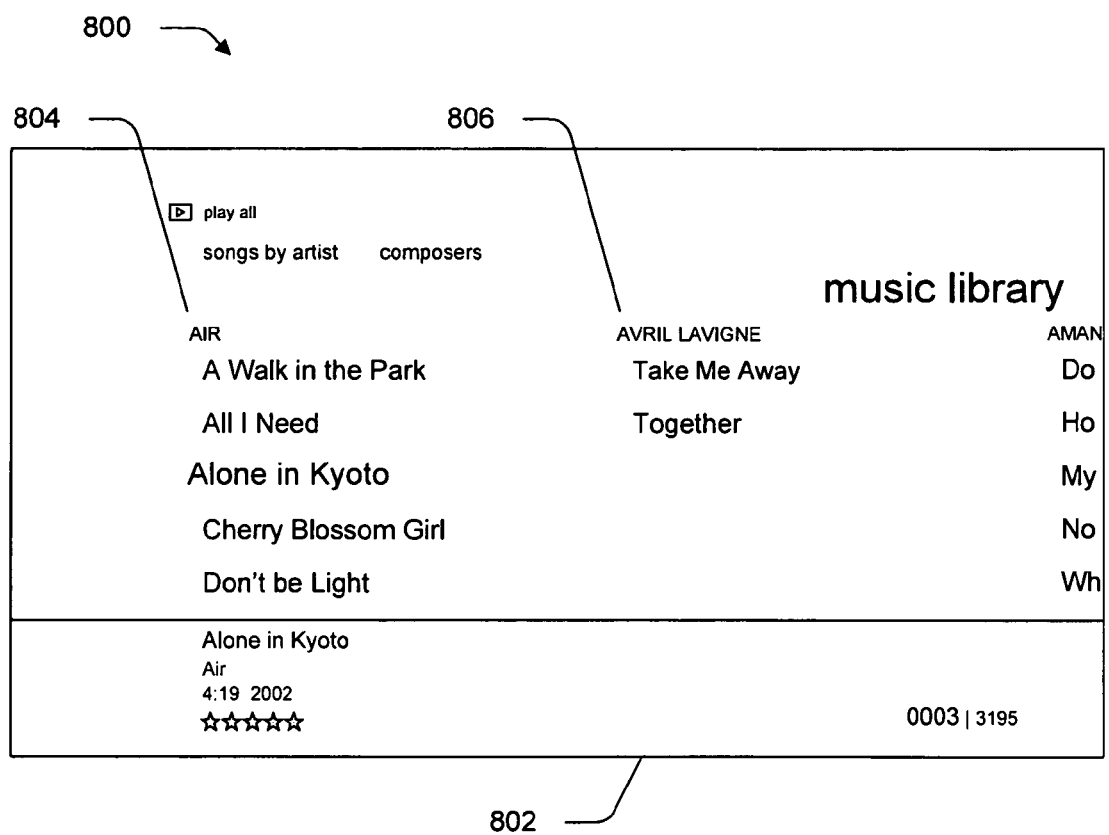
FIG. 8 is an illustration of an exemplary implementation showing a media user interface configured as a music library to enable a user to navigate through a collection of songs using left/right navigation.

FIG. 8 illustrates an exemplary implementation 800 of a media UI configured as a music library to enable a user to navigate through a collection of songs using left/right navigation. The illustrated media UI 802 provides global navigation between artists horizontally such that a user may move through the entire body of artists using left/right navigation. Additionally, the songs by each respective artist are grouped vertically. Therefore, the user may navigate up and down to select individual media items in a list (e.g., songs by a particular artist), but to actually move the entire body of the list, the user navigates left/right.

Thus, the user is provided with the ability to move by column (e.g., group), which allows the user to "skip" between collections of items, such as from "Air" 804 to "Avril Lavigne" 806 in FIG. 8 as opposed to having to move individually through each media item, one at a time. The horizontal alignment of the media UI may also provide a variety of other features.

Figure 9:
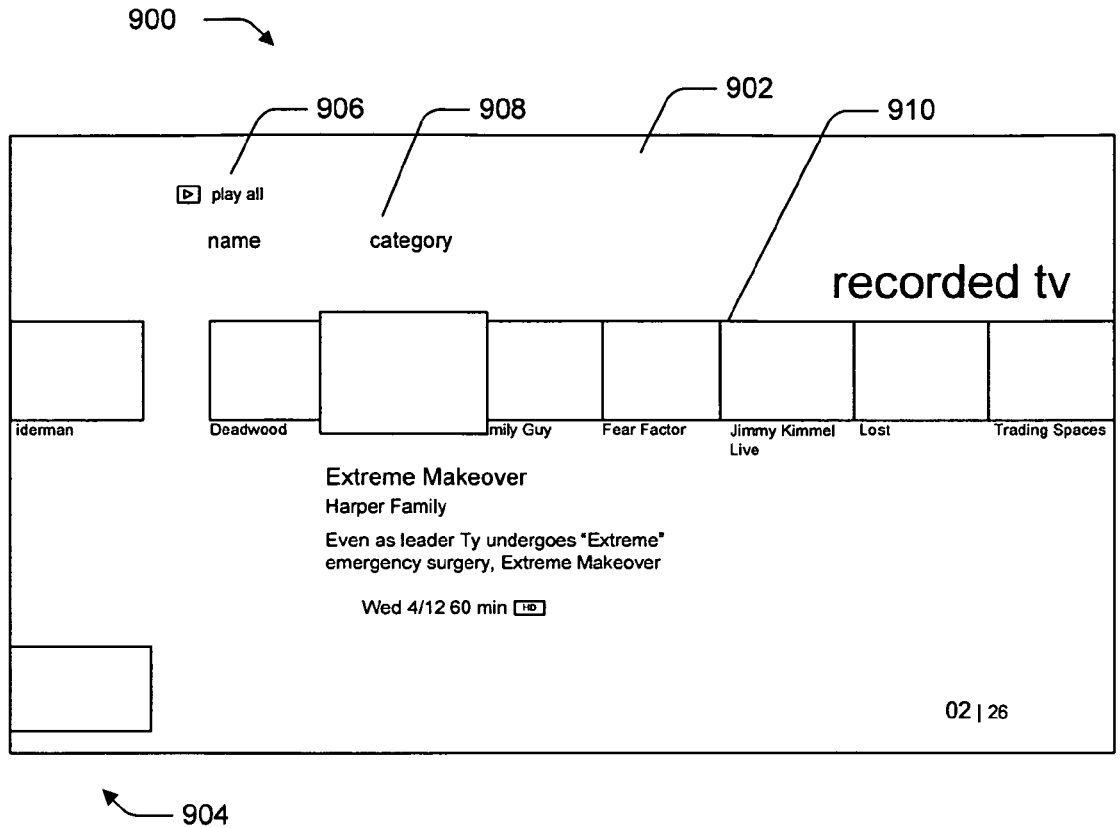
FIG. 9 is an illustration of an exemplary implementation showing a media user interface configured as a start menu to select recorded television programs.

FIG. 9 illustrates an exemplary implementation 900 of a media UI configured as a start menu to select recorded television programs. The media UI 902 includes a plurality of representations of recorded television programs, from which, a user may select a particular program for viewing. For example, a user may navigate to the start menu (e.g., media UI 902) and select a television program, which may then be displayed at the bottom of the media UI 902 as a picture-in-picture 904 (PIP), i.e., an inset.

The media UI 902 includes features configured as commands 906 (which may be applied to the represented media items), pivots 908 (which sort/arrange representations) and a gallery 910 of media item representations (e.g., album art, movie posters, etc.), further discussion of which may be found in relation to the "Gallery Control" section. At the bottom of the media UI 902 is the PIP 904 which is accessible by navigating "down" from the gallery 910. Use of traditional techniques, however, often resulted in the users being unaware of how to navigate to the PIP, such as by requiring a user to move between grids and columns of media items and then navigate down a particular one of the columns of items (e.g., a leftmost column) to select a PIP. By providing the PIP 904 at the "bottom" in a horizontally oriented user interface, the user can navigate "down" from the representations of media items to intuitively navigate to the PIP 904. Thus, a simplified structure for the media UI 902 is provided which employs lists that are oriented left/right, i.e., horizontally, across the viewable-area of the display device.

Figure 10:
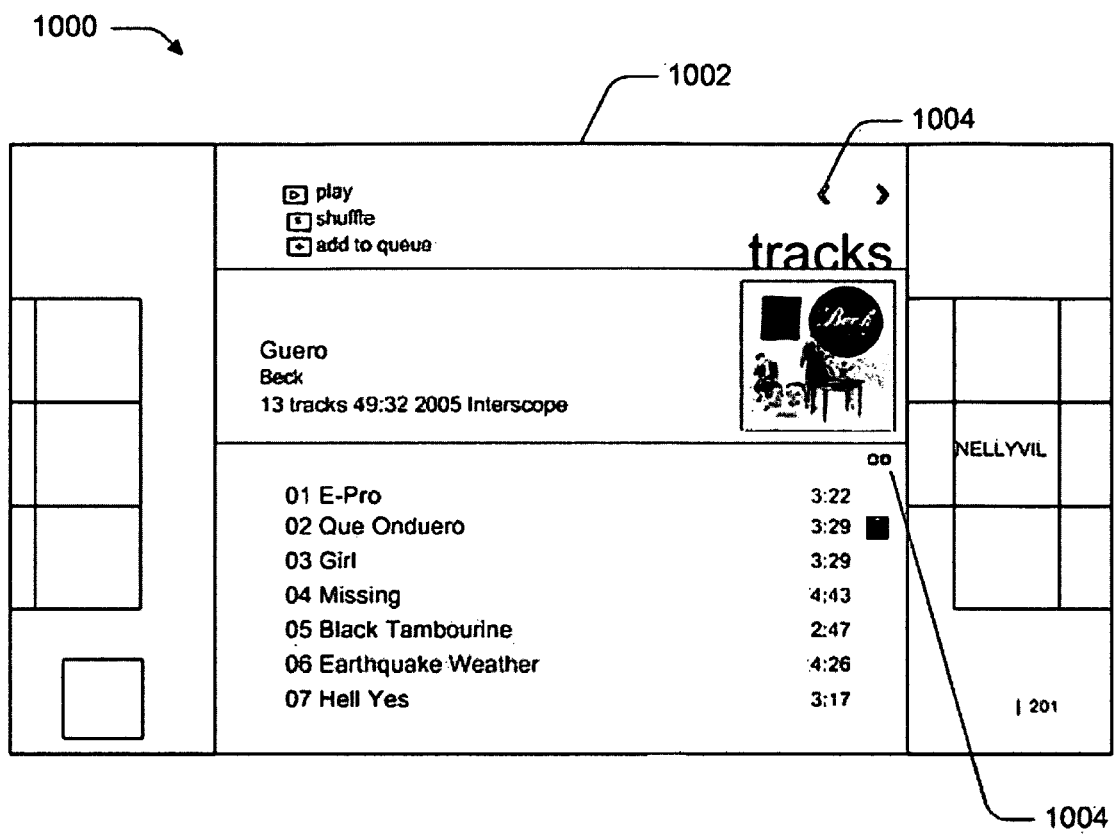
FIG. 10 is an illustration of an exemplary implementation of a media user interface that is configured to provide navigation through details of a group of media items, which in this instance is an album.

FIG. 10 illustrates an exemplary implementation 1000 of a media UI 1002 that is configured to provide navigation through album data. The media UI 1002 of FIG. 10 is configured to provide features relating to a particular group of media items, which in this instance is an album. The illustrated media UI 1002 shows songs which are available on the album, each of which may be selected through vertical (i.e., up/down) navigation.

Figure 16:
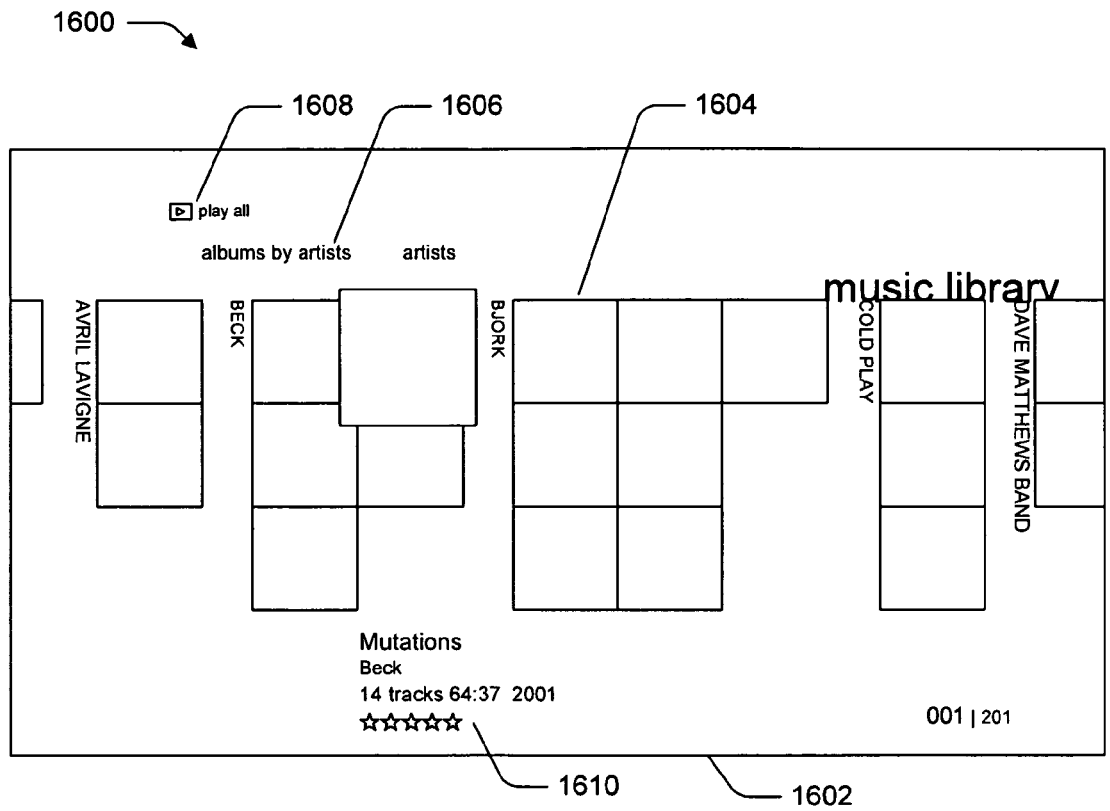
FIGS. 16, 17 and 18 are illustrations of exemplary implementations of respective media user interfaces having a tiered hierarchy of representations of media items, pivot areas and command regions.

Navigation between categories of features is provided in this instance through horizontal (i.e., left/right) navigation, and therefore the user may navigate through global contexts for the album. For example, if the user does not wish to navigate to a particular track, e.g., the user wants more information about the album, the user may navigate left/right through the features. An indication 1004 that this functionality is available (e.g., that additional screens/pages are available through left/right navigation) is shown through the use of arrows in the upper-right-hand corner of the media UI 1002. Another indication of "where" the user is located within the list is illustrated below the arrows by "breadcrumbs" 1004 (i.e., panel indicators) that are illustrated as below the media item having focus, e.g., which is displayed as enlarged relative to the other representations. Thus, FIG. 16 illustrates one of a plurality of "details pages" of the group of media items. Similar functionality may be provided for a wide variety of other media items.

Figure 11:
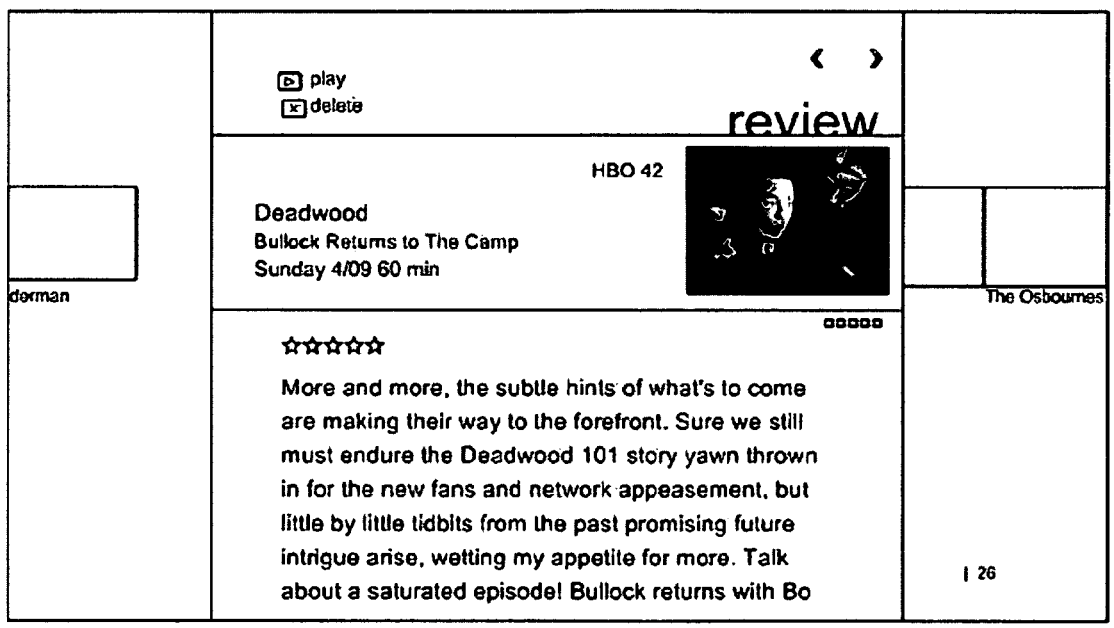
FIG. 11 is an illustration of an exemplary implementation of a media user interface configured as a details page for a television program.

FIG. 11 illustrates an exemplary implementation 1100 of a media UI 1102 configured as a details page for a television program. When the user navigates left/right from this page, the user may be provided with a variety of other categories of features relating to the television program, such as an "other showings" page, "settings" page, "recording" page, and so on. Thus, left/right navigation may provide an instance of a media item (or group of media items, such as an album) and related information about that media item in one place, which may be categorically arranged. Therefore, the user may navigate left/right to get different categories of related features for the particular media item or group of media items.

Traditional techniques, however, provided data individually such that the user had to "tunnel down" to find a particular media item of interest, information about that media, features related to the media item, and so on. Additionally, when the user was required to tunnel down multiple levels using traditional techniques to locate particular features of interest, the user may even "get lost" and therefore have a diminished view of the navigation experience. In the present example, however, whenever the user selects a representation of a media item or group of media items and initiates a "details" view of the item (e.g., by pressing a details button of a remote control), the user may navigate horizontally (e.g., left and right) between categories to locate additional information about that item without leaving the gallery because it is an overlay, and thus keeps the user within the context of that item.

Another feature of left/right model is that because left/right may be used to perform macro-level movement, it simplifies "up/down" in that each panel having a list may be configured in one-dimension (e.g., FIG. 8). For example, reference will again be made to FIG. 8 which shows a plurality of tracks of an album. When the user selects "left" or "right" navigation, the next panel is displayed, even if the user has navigated "down" a list of media items. Thus, the media UI for each panel is simplified in this example. For instance, when those panels are displayed, the user navigates left/right between those panels, effectively making each list a one-dimensional list, and each panel a one-dimensional panel. In another implementation, however, additional selection may be provided on items in the panel, for instance, the user may navigate down through a list to an item and then left/right through panels particular to that item.

As previously described, left/right navigation may also allow the user to stay in a current consumption state (e.g., listening to a song, watching a television program, etc.) without actually leaving, because the user has merely moved the views and/or pivoted the panels. For example, when the user is listening to songs of an album and wants to shuffle them, traditional techniques required the user to navigate to another destination, go to a settings page to select "shuffle" and then navigate back to music now playing. In the present instance, however, by placing pertinent data in the left/right panels, the user may remain within the desired experience.

In an implementation, functionality referred to as "now playing" is provided which takes the user to something that is actively playing. For example, a television experience may have a "now playing" overlay, music may have a "now playing" overlay, and so on. Once launched, the "now playing" experience may be provided as a full screen, zoom only experience. For example, in the case of television programming, a user may be watching a television program and want to see what other television programs will become available. Using traditional techniques, the user would select a "back" button, which would then cause the user interface to move back to a gallery for that TV show. The user would then select "back" again to get to a "my TV" page, where the user may look at information describing other showings. In the present implementation, however, the user may select left/right buttons which cause panels to be displayed which are context sensitive to a media type being rendered. For instance, the settings may allow the user to rotate, delete, crop, touch up, or print an image (FIG. 5), play a song, and so on. Thus, context sensitivity provides the user with features that are appropriate to this consumption mode and these features may be navigated via left/right navigation.

Left/right navigation may be provided in a variety of ways. For example, in "now playing", if the consumption context relies on full-screen (e.g., like television programming or video), where the video itself consumes available display area of a display device, when the user selects left/right, these panels may be displayed on the bottom of the media UI and are left/right navigable. As before, the panels are displayed "on top" of the experience as an overlay such that the panels conserve available display area of the display device. For music, where it is not a full-screen video experience, the entirety of a panel of the media UI may be rendered on the screen. Therefore, when the user navigates left/right, the entire screen "shifts over" left or right. Further discussion of left/right navigation may be found in relation to FIG. 23.

Gallery Control

Figure 12:
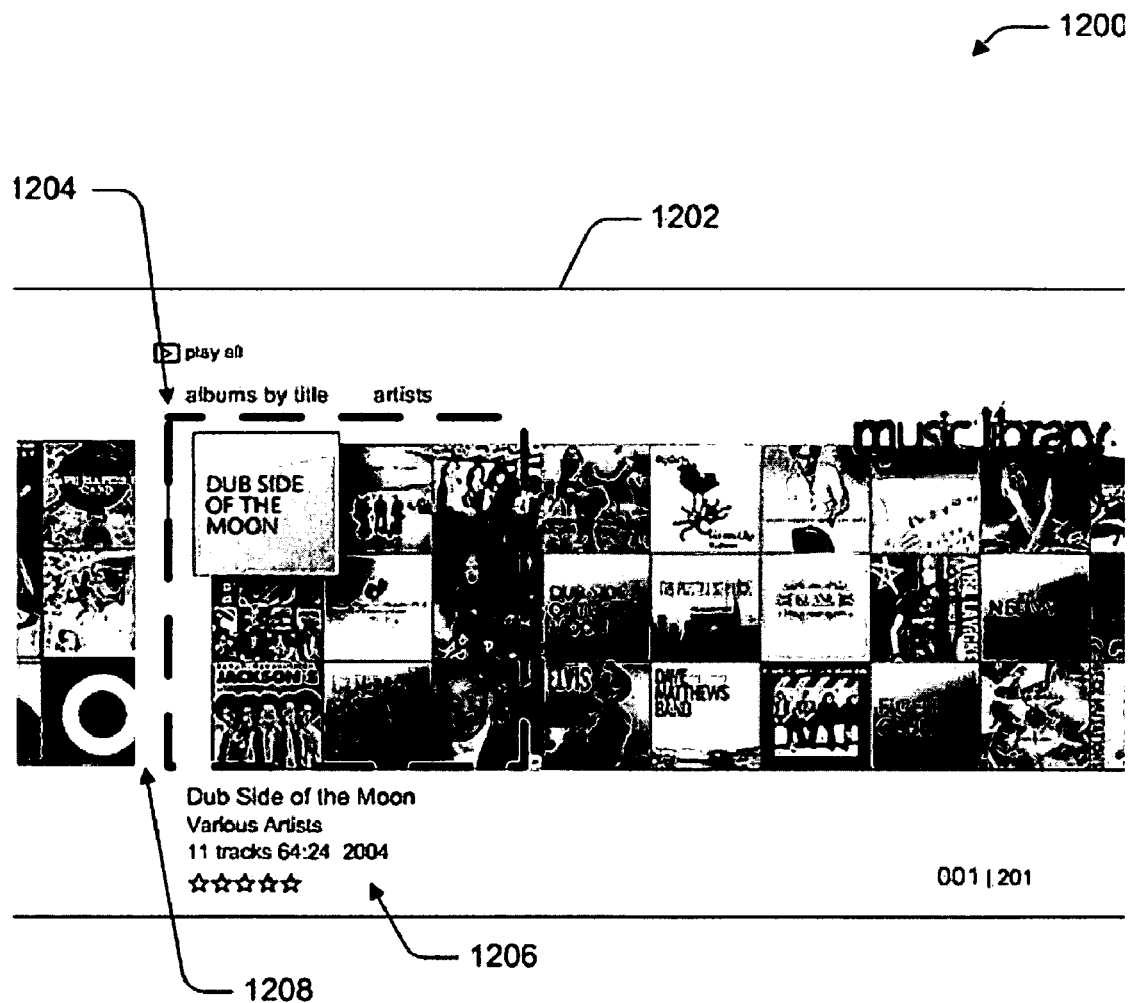
FIG. 12 is an illustration of an exemplary implementation of a media user interface configured as a start menu, from which, music may be selected.

FIG. 12 illustrates an exemplary implementation 1200 of a media UI 1202 configured as a start menu, from which, music may be selected. The media UI 1202 is shown in which may be referred to as a three-row gallery view having three horizontally-oriented carousels. Through use of an input device, a user may navigate left/right and up-down through representations of albums in this instance to select albums to be output by the entertainment server 112. Thus, as previously described the user may move left/right to navigate between the different tiles, which may be arranged in a circular carousel such that the user may continually scroll in a single direction to access each representation in that carousel, i.e., the carousel is a loop.

Center-Locking Region

In an implementation, the media UI 1202 provides center-locking behavior, in which, "focus" is retained. This is illustrated in FIG. 12 through the use of a dashed box to depict the center-locking region 1204. Metadata 1206, which is illustrated at the bottom of the media UI 1202, may follow the focus, which in the illustrated instance is the album "Dub Side of the Moon". Thus, the center-locking region 1204 provides an area of the media UI 1202, in which, the user may select representations.

In an implementation, the user may not navigate past the "edges" of the center-locking region 1204 depicted by the dashed lines. Rather, in such an instance the representations (e.g., of albums in this instance) are scrolled (e.g., rotated) as a whole in the direction indicated by the user. In other words, the user in this implementation cannot get to the edges of the media UI 1202 without scrolling the entirety of the representations. Therefore, representations that are displayed in the media UI 1202 and are not in the center-locking region 1204 are not selectable by the user until the user rotates (i.e., scrolls) the representations into the center-locking region 1204. Thus, the media UI 1202 may provide a universal template for both 4:3 and 16:9 screen formats that optimizes available display area of a display device.

In the illustrated implementation, the center-locking region 1204 of FIG. 12 is "3 by 3" such that the user may navigate "up" and "down" as well as "left" and "right" to select representations of media items in the center-locking region 1204. In the following discussion, "up" and "down" may refer to respective directions using vertical navigation through the media UI while "left" and right" refer to respective directions using horizontal navigation.

Figure 13:
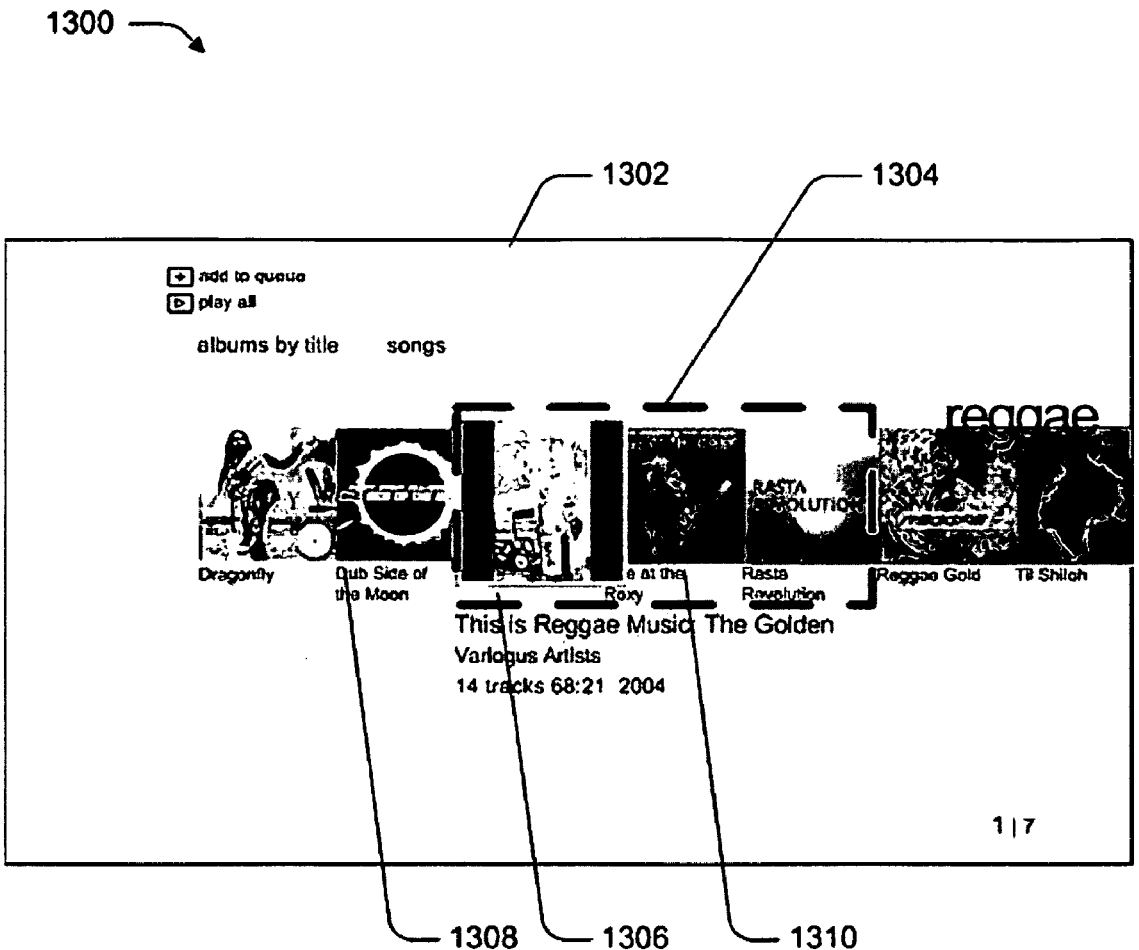
FIG. 13 is an illustration of another exemplary implementation of a media user interface configured as a single horizontal carousel to select albums by title.

FIG. 13 illustrates another exemplary implementation 1300 of a media UI 1302 configured as a single horizontal carousel to select albums by title. In this instance, like the instance of navigating through a "3 by 3" grid of FIG. 12, navigation is provided between three successive items in a horizontal row. Once the user reaches the end of the center-locking region 1304 (again illustrated as a dashed box), the list is scrolled through the media UI 1302. For instance, a user may navigate from the representation "Live at the Roxy" to the representation "Rasta Revolution" in the center-locking region without causing each of the representations to scroll in the media UI 1302. However, when the user attempts to navigate from the representation "Rasta Revolution" to the representation "Reggae Gold", each of the representations is scrolled to place the representation "Rasta Revolution" in the center-locking region 1304 in the media UI 1302.

Gap Management

Reference will now be made again to FIG. 12. As illustrated to the left of the center-locking region 1204 (i.e., the dashed box), a gap 1208 is illustrated which indicates the beginning and the end of the list being displayed. In other words, the gap 1208 is a visual cue as to where the list begins and ends. Otherwise, a continuous circle would be provided, in which, the user would not be readily informed as to where the list begins and ends, e.g., where the A's were versus the Z's in the illustrated album list may be found.

As illustrated, the gap 1208 is not the same width of the representations of the media items, which in this case are illustrated as album covers. In an implementation, navigation through the gap 1208 is managed differently that navigation through the representations themselves. For example, when the gap 1208 moves into the center-locking region (i.e., the dashed box), the focus area stays at the same point and does not move until that gap moves out of the center-locking region 1204. For instance, the entire list, when the gap 1208 is in the center locking region, may be scrolled when the user moves to the left or right. Therefore, the "size" (i.e., an amount of display area) consumed in the media UI 1202 by the center-locking region 1204 is retained. Otherwise, the size of the center-locking region 1204 would need to expand when the gap 1208 is included, which may have a detrimental effect on how the rest of the representations are rendered, such as by requiring recalculation of how each other representation is to be displayed.

In this way, the gap 1208 does not need to be the same size as the representations of the list, which in the illustrated implementation of FIG. 12 is shown as "thinner" (i.e., consuming less horizontal display space in the user interface) than the representations of media but is "wider" (e.g., larger) than gaps provided between other representations. In the illustrated instance, gaps are not provided between the representations that are not disposed at the "beginning" or "end" of the list, i.e., the representations "touch" and therefore have an effective gap of "zero". Thus, when the gap 1208 is in the center-locking region 1204, each representation is scrolled, and when the gap is not in the center-locking region 1204, navigation through the center-locking region 1204 is provided without scrolling each other representation.

Further, the size of the gap 1208 may be maintained in different views of media items having different sizes of representations, such as for movie posters and so on. Therefore, a consistent look and feel is provided to the user even when interacting with different media types. For instance, a user may readily identify the gap 1208 when viewing different media types and therefore be informed as to where a list of media items begins and ends.

Metadata Focus

Figure 14:
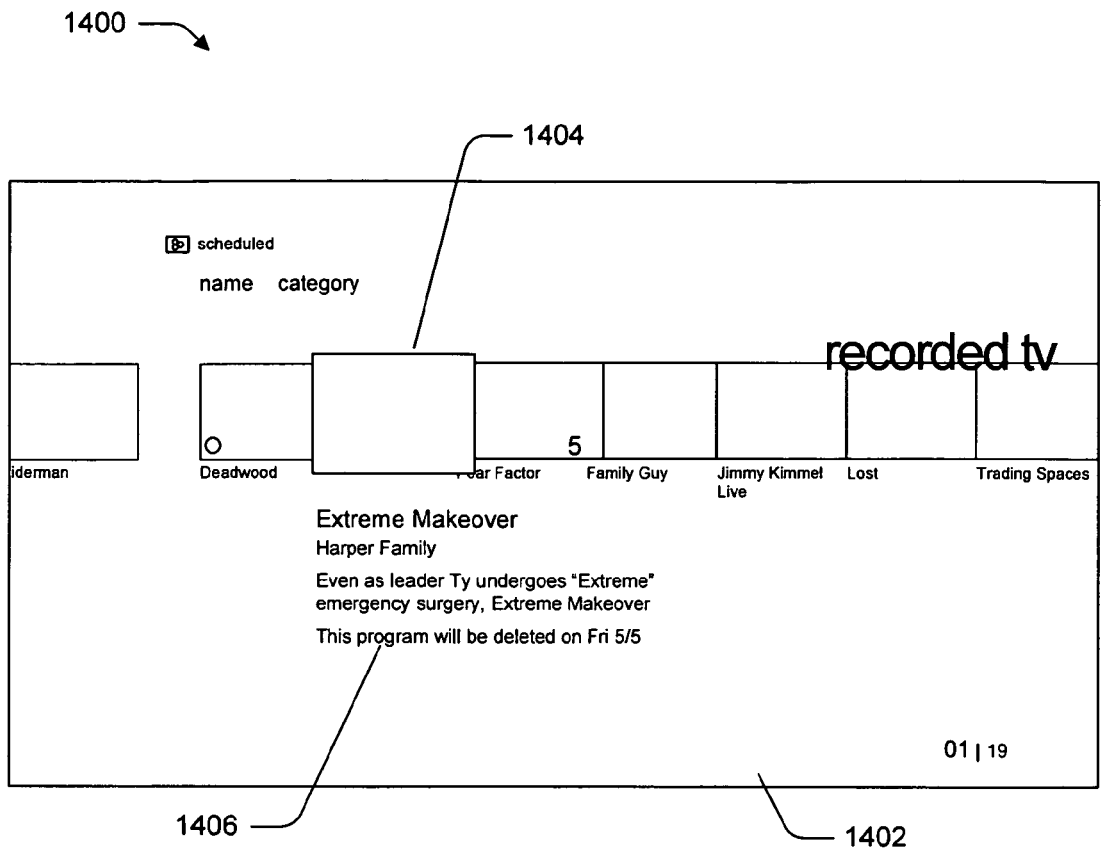
FIGS. 14 and 15 are illustrations of exemplary implementations showing respective media user interfaces, in which, metadata follows selection of the representations.
Figure 15:
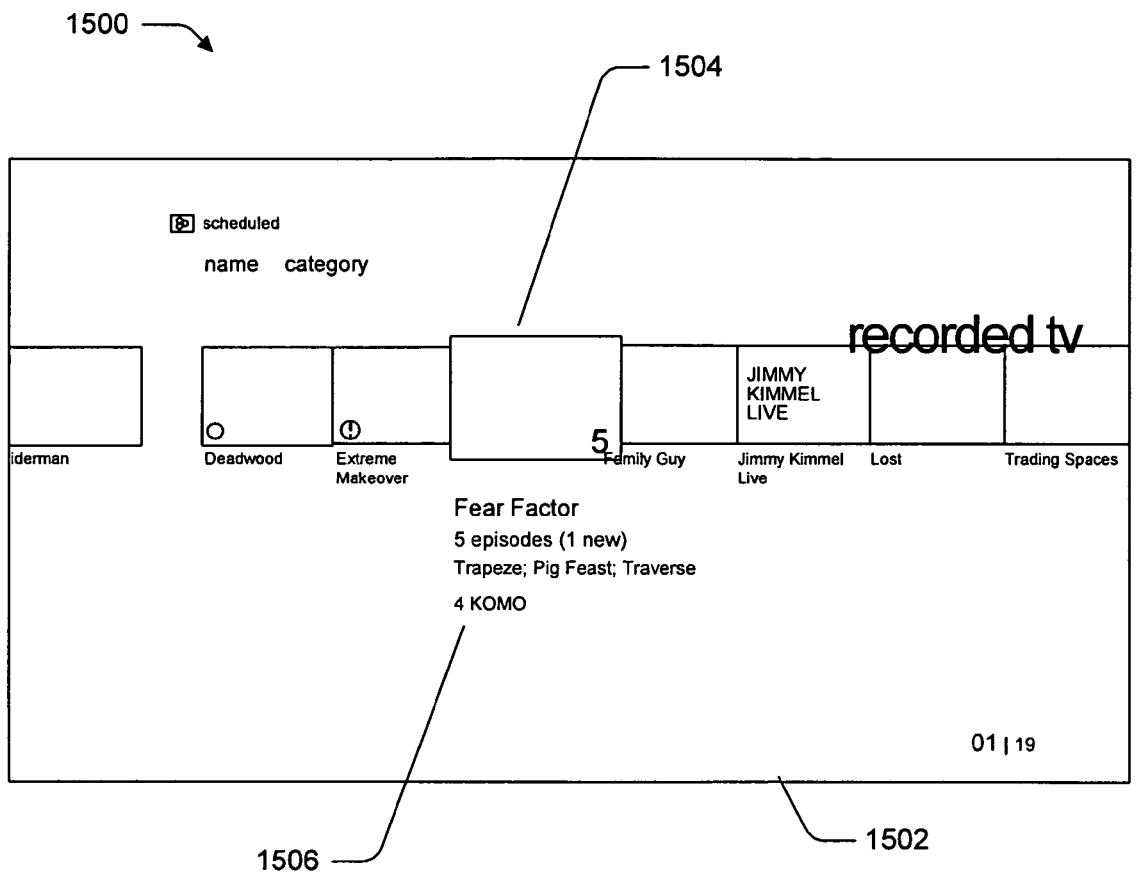

FIGS. 14 and 15 illustrate exemplary implementations 1400, 1500 showing respective media UIs 1402, 1502, in which, metadata follows the "focus" of the selected representations. For instance, in the user interface 1402 of FIG. 14, a representation 1404 of the television show "Extreme Makeover" is shown as in focus (e.g., selected) and therefore metadata 1406 pertaining to that television show is displayed proximally to the representation 1404. In the media UI 1502 of FIG. 15, the user has navigated to the "right" from the "Extreme Makeover" representation to a representation 1504 of a television program "Fear Factor". Thus, the representation 1504 "Fear Factor" is shown as being focused (e.g., enlarged and brighter relative to the other representations in the media UI 1502) and metadata 1506 is displayed proximally to the representation. Thus, the metadata "follows" the focused representations, i.e., the display of metadata follows the selection of the representations.

Tiered Hierarchy

Figure 17:
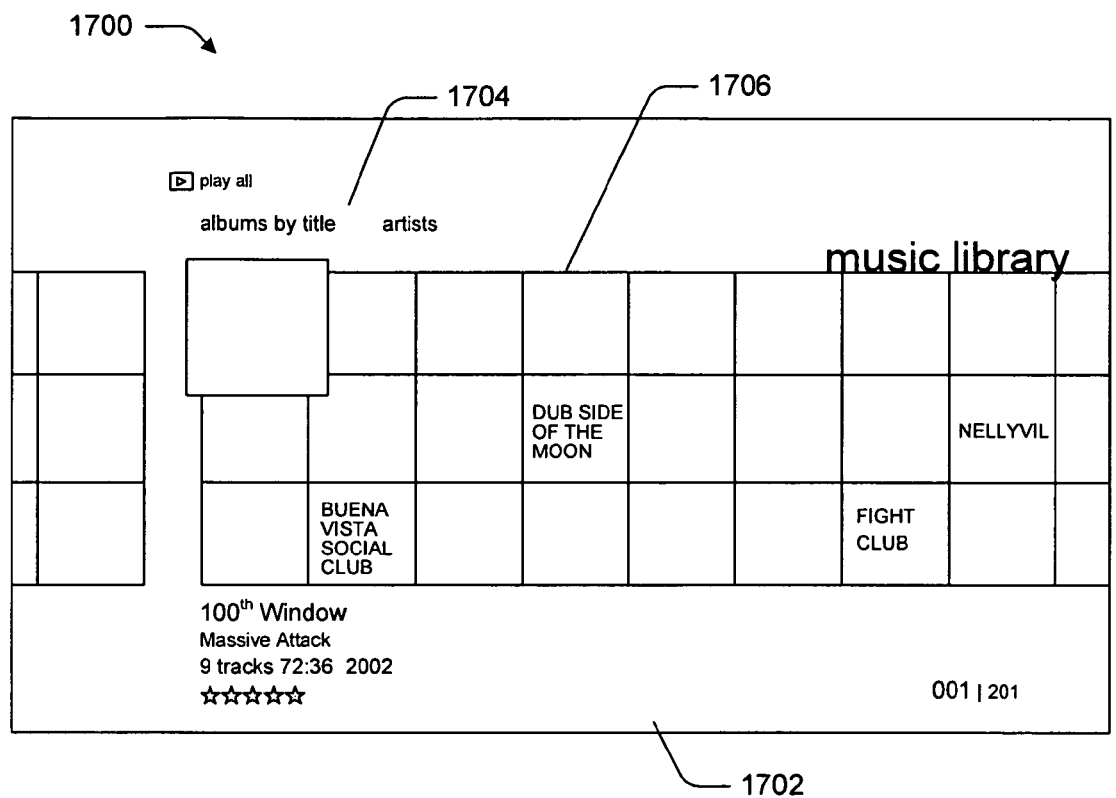
Figure 18:
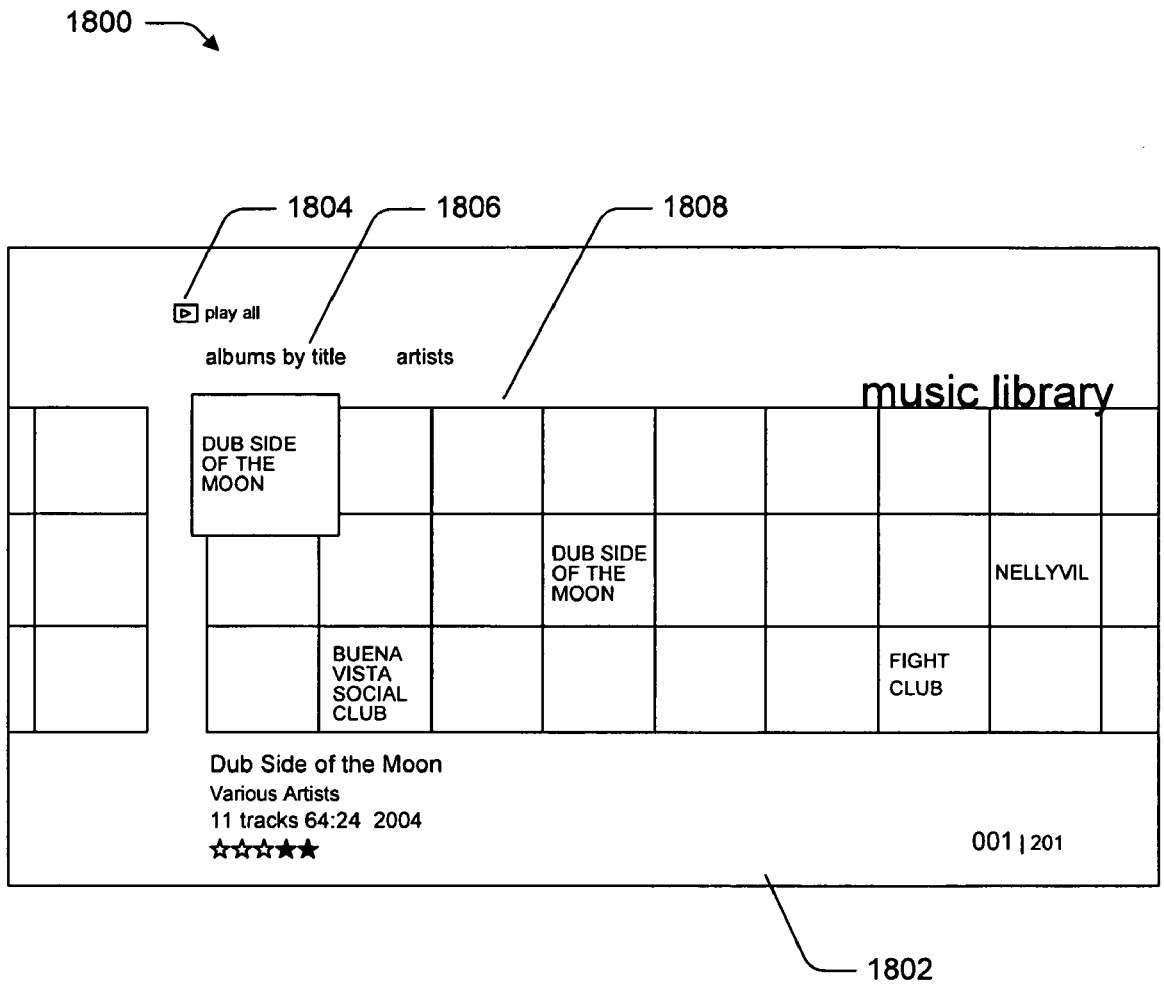

FIGS. 16-18 illustrate exemplary implementations of respective media UIs 1602, 1702 and 1802 having a tiered hierarchy of representations of media items, a pivot areas and command regions. Reference will now be made to FIG. 16, in which, a user may navigate from a gallery area 1604 containing representations of a plurality of media items to a "pivot area" 1606. Representations in the pivot area 1606 are selectable to change the "view" of representations of media items in the gallery area 1604. The media UI 1602 also includes a command area 1608 which includes commands which may be performed and relate to the represented media items in the gallery area 1604.

The media UI 1602, for instance, has "albums by artists" selected in the pivot area 1606, which causes representations of albums to be grouped according to artist in the gallery area 1604. Representations of albums that are selected in the gallery area 1604 (i.e., have "focus") have corresponding metadata displayed in a metadata area 1610 of the media UI 1602, which in this instance is the album "Mutations" by the artist "Beck" that is illustrated as having focus in the gallery area 1604. It should be noted that in this instance, the metadata also follows the selection (e.g., focus) of the representations as previously described in relation to FIGS. 14 and 15.

The user may then navigate vertically "up" from the gallery area 1604 to the pivot area 1606 to change the view of items in the gallery area 1604, e.g., how the media items are sorted in the gallery area 1604. As the user navigates through the available selections in the pivot area 1606, the gallery may be automatically updated. For example, the user may navigate to "albums by title" 1704 as illustrated in the media UI 1702 of FIG. 17. The gallery area 1706 is then automatically updated to arrange representations of the albums by title. Although album representations have been described, similar functionality may be employed for a variety of other media types in the gallery. For example, a media UI for images (e.g., digital photos) may be provided with a pivot area that provides functionality to arrange the images by date, source, and so on. Traditional techniques, however, directed the user to select a radio button to make the change and select "OK" outside of the current experience through the use of a dialog box. In this implementation, the change happens automatically without having to select "okay" by moving "right" and "left" through the pivot area.

In an implementation, one of more of the pivot items is selectable to provide additional functionality. For example, the pivot item "albums by" 1704 may have a plurality of sub-items, such as "title", "artist", "date", and so on. Therefore, the user may navigate to the "albums by" item using horizontal navigation and once by the pivot item, the user may select an "enter" or "ok" button, and then be provided with a menu of sub-items for selection. Once selected, the user may navigate through the sub-items using vertical navigation. A variety of other examples are also contemplated.

FIG. 18 (as well as in the other exemplary FIGS. 16-17) illustrates a media UI 1802 having a "command region" 1804. The command region 1804, like the pivot region 1806 and the gallery region 1808 is accessible via vertical (e.g., up/down) navigation in the media UI 1802. For example, a user may navigate (e.g., move focus) up from the gallery region 1808 having representations of media items through the pivot region 1806 (e.g., having the pivots previously described) and "up" to the command region 1804. In an implementation, one or more of the commands in the command region 1804 may apply to the entire view. For instance, commands such as "play all", or "add to queue" may be included in the command region 1804.

For example, a user may navigate to a gallery view of songs from a particular artist and select "play all" from the command region, which would act to select all the songs in this view to be played. Likewise, for "add to queue", all the songs by the particular artist would be added to a queue. For instance, a user may create a playlist where the user desires to listen to jazz albums. The user may then select a pivot "genres" to find all the available jazz songs and the select "play all" to cause the songs listed in that genre to be played. Although described for music, this functionality may be provided for a variety of media types. For example, pictures may be viewed as a slide show in a specified order, such as by date, author, and so on. The user may then navigate to a command region and select "play slide show", which would cause each of the images in that gallery to be played. Thus, the command region may be context sensitive, although it should be noted that the command region is not necessarily context sensitive to the gallery, e.g., the command region may include commands which are generic to the type of media item be represented and/or output.

Start Menu

Figure 19:
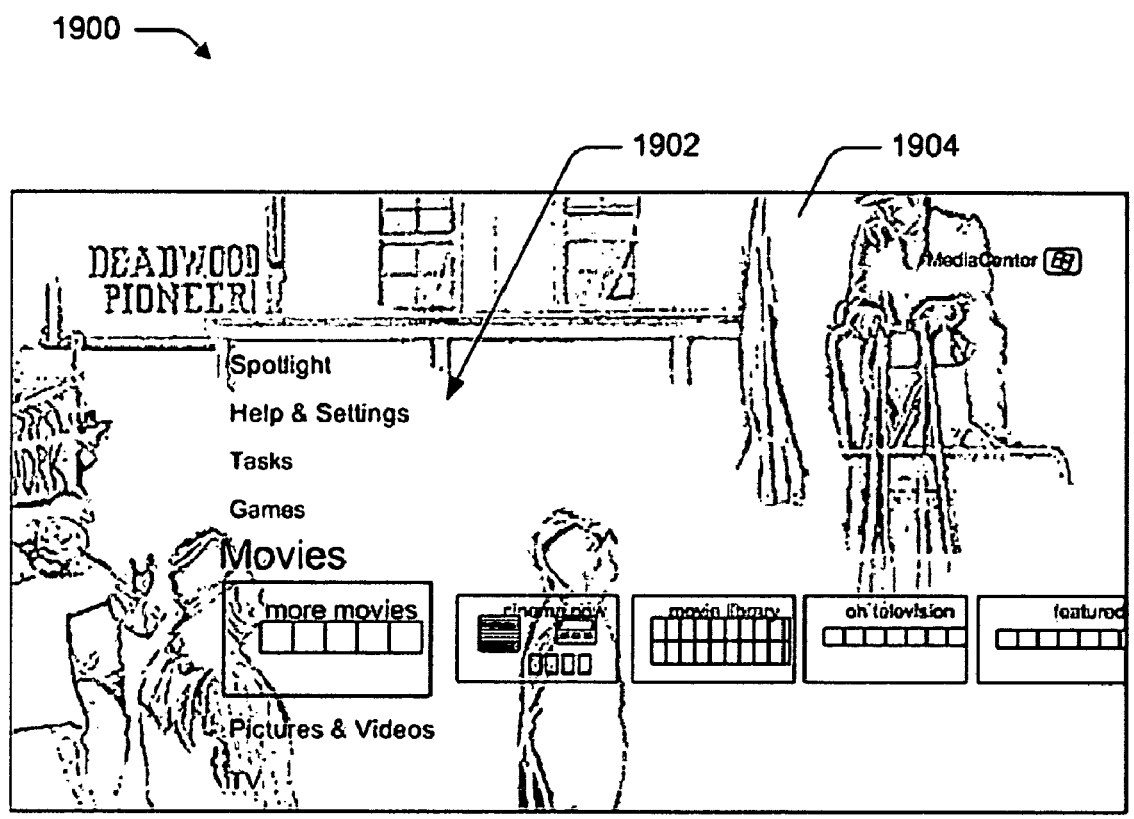
FIG. 19 is an illustration of an exemplary implementation showing a media user interface configured as a start menu and provided as an overlay over a display of media.

FIG. 19 illustrates an exemplary implementation of a media UI 1902 configured as a start menu as provided as an overlay over a display of media 1904. In the illustrated implementation, the media item 1904 is a television program (i.e., Deadwood) which substantially occupies the display area of a display device. Additionally, the media UI 1902 (e.g., the start menu) is displayed as generally over the display of the media item (e.g., the television program) such that substantial portions of the media item are viewable "beneath" the start menu as previously described.

Features available in the media UI 1902 are displayed in a vertical arrangement. Additionally, each of the features may be given "focus" to display sub-features, an example of which is illustrated as "Movies" having sub-features of "more movies", "cinema now", "movie library", "on television" and so on. Thus, when a user selects a start button, the media UI 1902 may appear as an overlay such that the user may continue to view the media item 1904 as substantially occupying the entirety (e.g., the available display area) of the display device and concurrently interact with features of the start menu. Traditional techniques, however, took the user to a separate page.

Figure 20:
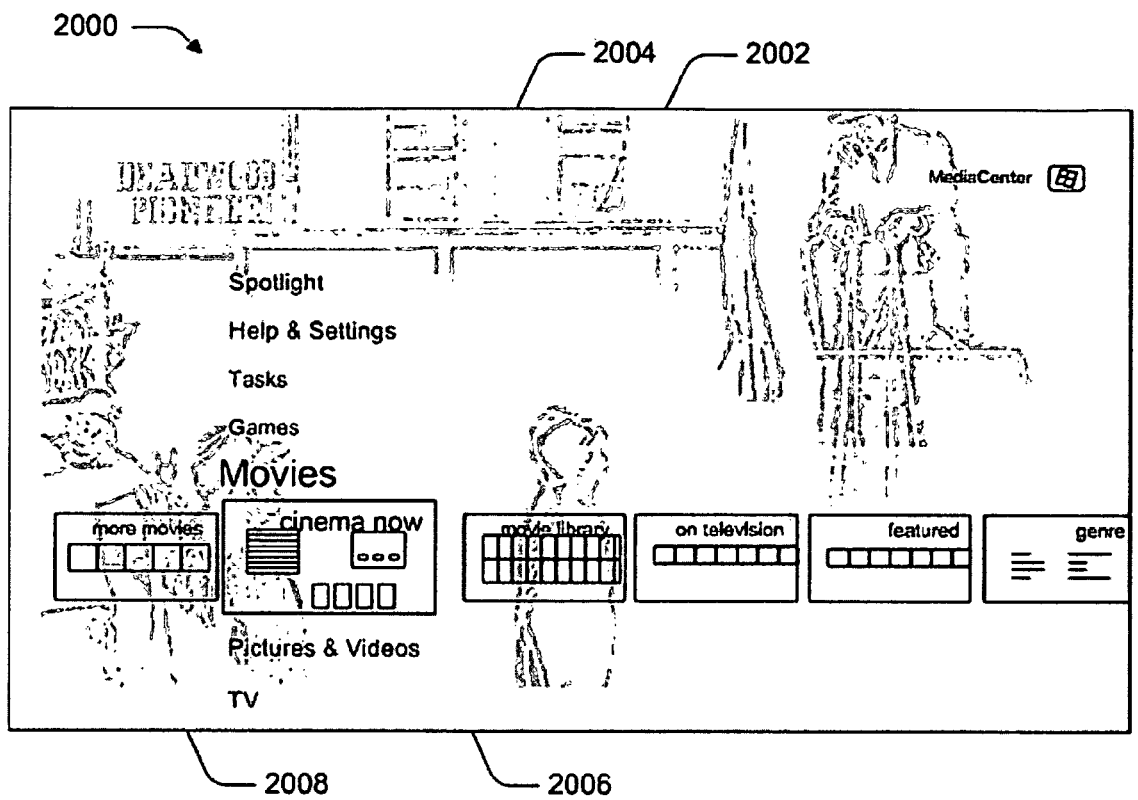
FIG. 20 is an illustration of an exemplary implementation showing a media UI configured to provide partner customization.

FIG. 20 illustrates an exemplary implementation 2000 of a media UI 2002 configured to provide partner customization. Various positions within the media UI 2002 may be provided to partners (e.g., customers of a provider of the media UI 2002) to display representations that are selectable to navigate to media items provided by the partners. For instance, the user may navigate to the "movies" category 2004. In this category, a representation 2006 (illustrated as a representation configured as a "tile" for a media item "Cinema Now") for one or more media items of a particular partner is included within a primary display screen for the movies 2004 category. Therefore, a user may navigate to the category (e.g., movies 2004) and view a representation 2006 (e.g., "Cinema Now") which is given precedence in that particular category.

Also included is a representation called "more movies", which allows for representation of additional media items in a secondary display screen. For example, a user may navigate to the "more movies" representation 2008 to cause a secondary display screen to be output which includes representations of additional media items. Thus, the media UI may provide a primary display screen which contains "top level" features and media items and a secondary display screen to access other features and items. Positions for representations of media items may also be provided in the secondary display screen accessible via the "more movies" representation 2008. Once selected, the user may be taken to a filtered view of each of the other movie partners that provide media items that are available via the entertainment server 112. As should be apparent, this may apply to a variety of media types, such as music and so on, and may be categorized by media types such that partner tiles are placed within the relevant experience. Further discussion of positioning of representations in a media UI may be found in relation to FIG. 26.

The start menu may also be configured to have context (e.g., content) sensitivity, which in conjunction with configuration as an overlay, may provide additional functionality. For example, a user may watch a television program and need help to record the television program. Therefore, the user may select the start button to cause the start menu to be output. Because the start menu is now an overlay instead of a destination, like a homepage, the start menu may be displayed in conjunction with the television program. In another example, once the user selects "help", an executable module (e.g., the media manager module 120) may determine "where" the overlay is being deployed (e.g., within the television experience) and therefore provide context-sensitive instructions. Traditionally, when the help menu was a destination, this functionality could not be provided because it would not know "where" the request originated.

Context sensitivity may be provided in a variety of other instances, such as sensitivity to music, pictures, videos, and so on as previously described. For example, when the user selects the start button, commands may be presented based on which experience (i.e., "where"), with which, the user is currently interacting. This allows the removal of home pages and other such pages used for navigation. Traditional techniques, for instance, used a "My TV" page, a "My Music" page, "My Movie", and so on. However, in the current example the context sensitive experience may provide those destinations as a part of a script. Thus, the user may navigate to any point, anywhere and at anytime because it is an overlay and because the module (e.g., the media manager module 120) knows "where" the user is located, e.g., which consumption experience.

Exemplary Procedures

The following discussion describes media user interface techniques that may be implemented utilizing the previously described systems, devices and user interfaces. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment, systems and media UIs of FIGS. 1-20.

Figure 21:
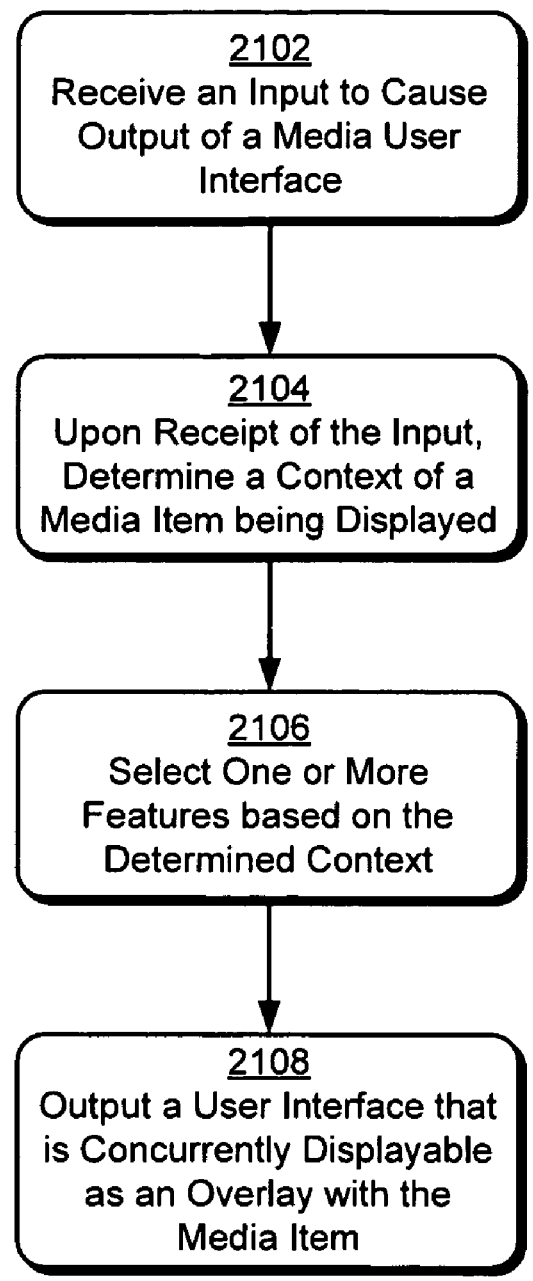
FIG. 21 is a flow diagram depicting a procedure in an exemplary implementation in which a context of a media item is determined to select features for inclusion in a media user interface.

FIG. 21 depicts a procedure 2100 in an exemplary implementation in which a context of a media item is determined to select features for inclusion in a media UI. An input is received to cause output of a media UI (block 2102). For example, a user may employ a cursor-control device (e.g., a mouse), a remote control, a keyboard, and so on, to cause a media UI to be displayed, such as a details overlay, a now-playing overlay, and so forth.

Upon receipt of the input, a context of a media item being displayed in determined (block 2104). For instance, the media manager module 120 may be executed to determine if a media item is currently being displayed, and if so, a context in which the display is being achieved. A variety of contexts may be determined, such as a consumption context relating to a type of the media item (e.g., type of media item, type of rendering device utilized to output the media item, and so on), one or more actions that were performed (e.g., features employed) before the input was received, and so forth.

One or more features are then selected for inclusion in the media UI (block 2106). The selected features, for instance, may relate to processing of the media item (e.g., editing features for an image of audio file, playback options for a stored television program in a DVR), storage of the media item (e.g., to record a television program), provision of information related to the media item (e.g., obtain metadata describing a television program or song), and so forth.

The media user interface that is concurrently displayable with the media item is output as an overlay (block 2108). Thus, the user remains within the consumption context of the media item and is able to interact with the media item using one or more features based on the context of the media item. For instance, when the user is in the gallery view and selects "ok", the details are displayed. In this case, the overlay is displayed "over" the gallery view and accepts user inputs. In another instance, in the case of a "now playing" overlay, if the user selects left/right, that panel is launched. If the user does not wish to continue viewing the panel, the user may select "back" and the panel is removed. Thus, the user remains in that media type context and each of these features is "brought" to the user. Traditional techniques, however, required the user to browse to another space, e.g., another page, and thus were "moved" progressively further from the consumption context of the media item.

Figure 22:
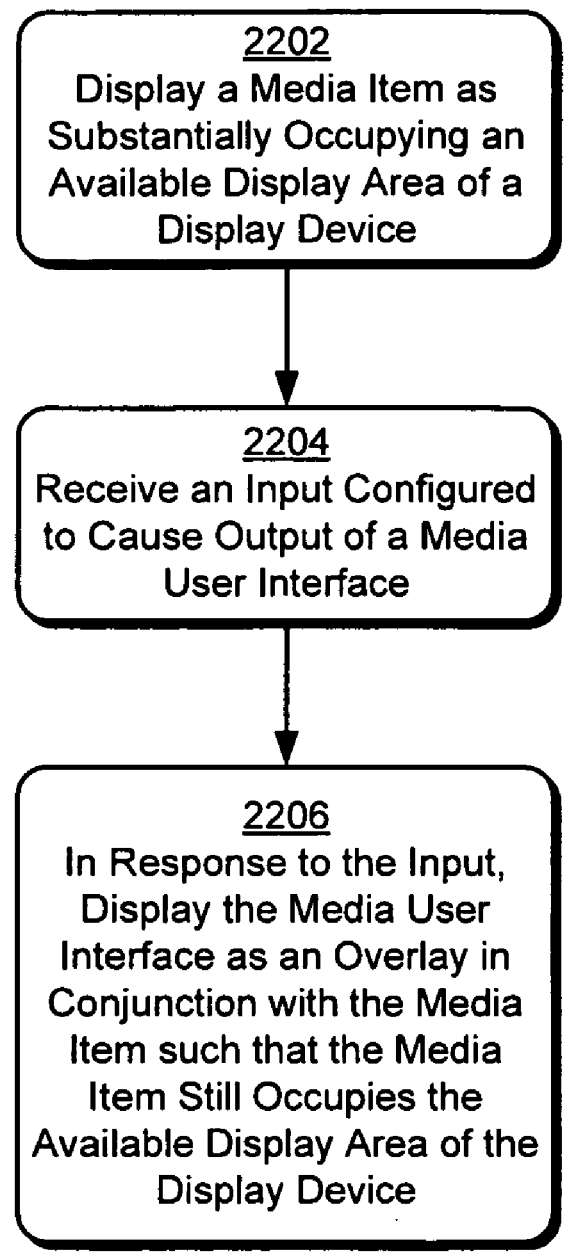
FIG. 22 is a flow diagram depicting a procedure in an exemplary implementation in which a media user interface is displayed concurrently with a display of a media item such that the media item substantially occupies available display area of a display device.

FIG. 22 depicts a procedure 2200 in an exemplary implementation in which a media UI is displayed concurrently with a display of a media item such that the media item substantially occupies available display area of a display device. A media item is displayed as substantially occupying an available display area of a display device (block 2202). For example, the available display area of the display device may include an available display area having given dimensions, such as "X" height and "Y" width. The media item, when displayed, may therefore generally consume the given dimensions of the display area, e.g., approximate an "X" height and a "Y" width.

An input is received that is configured to cause output of a media user interface (block 2204). For example, the input may specify a details overlay, an electronic program guide, an editing overlay, and so on.

In response to the input, the media UI is displayed as an overlay in conjunction with the media item such that the media item still occupies the available display area of the display device (block 2206). The media UI, for instance, may be displayed across all or a portion of the available display area. Portions of the media UI may be translucent or transparent such that portions of the media item are viewable "through" the media UI as previously discussed in relation to FIGS. 3-7. Thus, the media UI and the media item may be displayed concurrently such that a user may select features of the media UI while still watching the media item in its originally displayed size. A variety of other examples are also contemplated without departing from the spirit and scope thereof.

Figure 23:
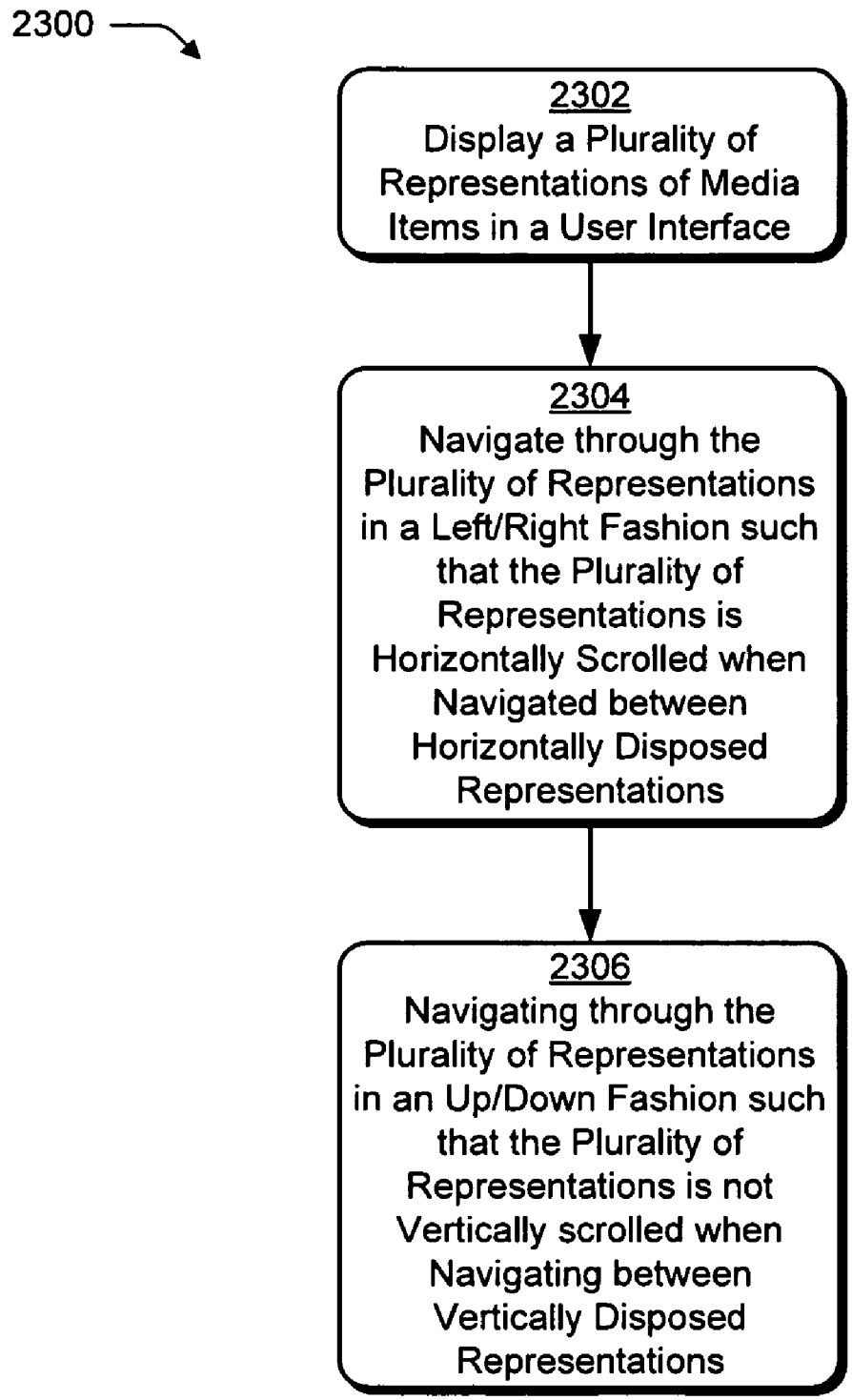
FIG. 23 is a flow diagram depicting a procedure in an exemplary implementation in which navigation through a plurality of representations in a media user interface is performed using left/right and up/down navigation.

FIG. 23 depicts a procedure 2300 in an exemplary implementation in which navigation through a plurality of representations in a media UI is performed using left/right and up/down navigation. A plurality of representations of media items are displayed in a user interface (block 2302). For example, the representations may be substantially horizontally oriented such that a greater portion of the representations are oriented along a horizontal axis of the media UI than a portion of the representations that are oriented along a vertical axis of the media UI, e.g., FIG. 9.

Navigation is performed though the plurality of representations in a left/right fashion such that the plurality of representations is horizontally scrolled when navigated between horizontally disposed representations (block 2304). For example, as shown in FIG. 9, a user may navigate from a representation of a television program "Extreme Makeover" to a representation of a television program "Deadwood". This navigation may cause the entirety of the plurality of representations to be scrolled horizontally like a carousel, such that the representation of "Spiderman" is not displayed but a representation off screen to the right of the displayed plurality of representations is then displayed. This navigation may continue such that the user may scroll through each of the plurality of representations in this instance without "changing directions", e.g., scrolling continuously to the left or to the right.

Navigation is also performed through the plurality of representations in an up/down fashion such that the plurality of representations is not vertically scrolled when navigating between vertically disposed representations (block 2306). For example, vertical navigation may be performed between representations of albums of FIG. 12 without causing the representations to be vertically scrolled. Other such examples may be found in relation to FIGS. 16-18. For instance, a user may navigate through albums arranged vertically in the media UI 1602 of FIG. 16 without causing the representations to be vertically scrolled.

Figure 24:
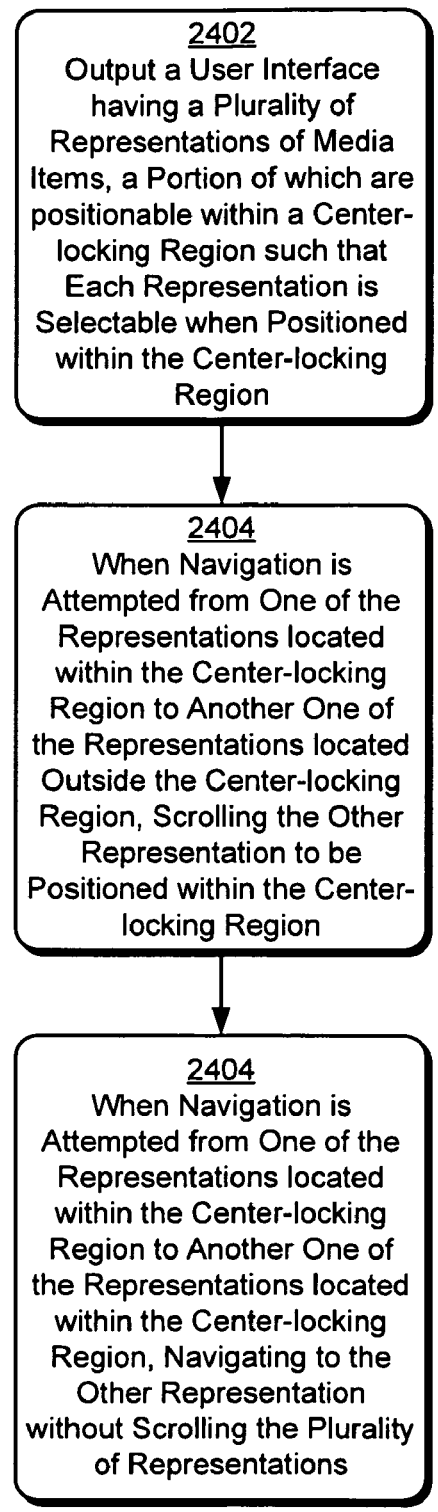
FIG. 24 is a flow diagram depicting a procedure in an exemplary implementation in which navigation using a center-locking region is described.

FIG. 24 depicts a procedure 2400 in an exemplary implementation in which navigation using a center-locking region is described. A user interface is output having a plurality of representations of media items, a portion of which are positionable within a center-locking region such that each representation is selectable when positioned within the center-locking region (block 2402). For example, the media UI 1202 of FIG. 12 includes a plurality of representations, a portion of which are disposed within a center-locking region 1204. A representation of an album "Dub Side of the Moon" is illustrated as selected by a user through use of offset and as by being enlarged relative to other representations.

When navigation is attempted from one of the representations located within the center-lock region to another one of the representations located outside the center-lock region, the other representations is scrolled to be positioned within the center-locking region (block 2404). For example, a user may utilize a remote control to provide an input that specifies navigation from a representation "This is Reggae Music: The Golden Years" 1306 in FIG. 13 to a representation of "Dub Side of the Moon" 1308 which is located outside of the center locking region 1304. In response to the input, each of the plurality of representations in the media UI 1302 is scrolled such that the representation "Dub Side of the Moon" 1308 is positioned within the center-locking region 1304, and therefore is selectable by the user.

When navigation is attempted from one of the representations located within the center-locking region to another one of the representations located within the center-locking region, navigation is provided to the other representation without scrolling the plurality of representations (block 2406). For example, an input may be received that specifies navigation from a representation "This is Reggae Music: The Golden Years" 1306 in FIG. 13 to a representation of "Live at the Roxy" 1310 which is also located within of the center locking region 1304. Accordingly, focus is shifted to the representation "Live at the Roxy" 1310 without scrolling the plurality of representations. Thus, navigation within the center-locking region 1304 is provided without scrolling each of the representations, while navigation outside of the center-locking region 1304 causes representations in the media UI 1302 to be scrolled.

Figure 25:
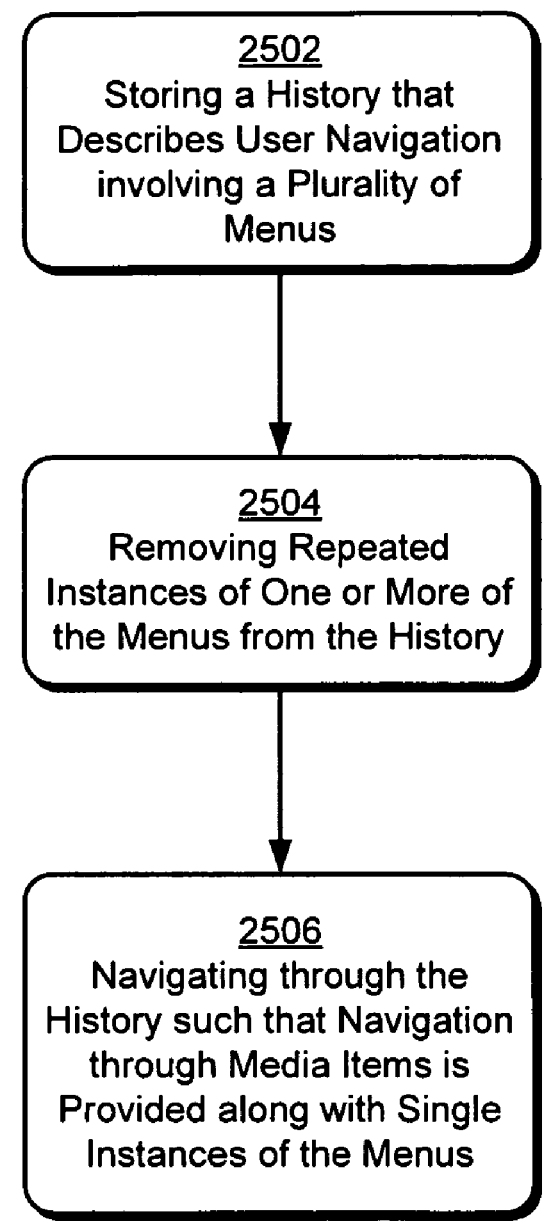
FIG. 25 is a flow diagram depicting a procedure in an exemplary implementation in which repeated instances of a menu are removed from a history of user navigation.

FIG. 25 depicts a procedure 2500 in an exemplary implementation in which repeated instances of a menu are removed from a history of user navigation. As previously described, because the start menu is overlay, it may be provided without being a "destination". Consider a traditional web page history stack, for instance, in which a user alternately navigated between media items and a menu. If a user were to select "back", the user would navigate alternatively between the media items and the same menu. In the present example, the history may be "trimmed" such that if the user selects "back"; the user would navigate to single instances of the menu and to media items previously selected. Thus, the user may navigate to each of the destinations without having the repeatedly navigate through the menu. Thus, in this example, the menu is provided in a single instance in the history "stack", with all other instances being "trimmed" away automatically and without user intervention.

For example, a history that described user navigation involving a plurality of menus is stored (block 2502). The user, for instance, may navigate between a plurality of media items (e.g., movies, television programs, songs, and so on) and menus utilized to interact with the media items, such as a start menu, details menu, and so forth.

Repeated instances of one or more of the menus are removed from the history (block 2504). For example, the media manager module 2504 may examine the history and remove any repeated instance of a menu, such as repeated instances of a start menu, details page, and so on. In another example, repeated instances for particular menus are removed, while other repeated instances are retained. For instance, repeated instances of a start menu may be removed while repeated instances of a details menu may be retained. A variety of other examples are also contemplated.

Navigation through the history is then performed such that navigation through media items is provided along with single instances of the menus (block 2506). For example, a user may utilize a "back" button to navigate through the history without revisiting a particular menu more than once. Therefore, the user still has access to the functionality of the menu without being required to repeatedly navigate through the menu to locate another menu or media item of interest.

Figure 26:
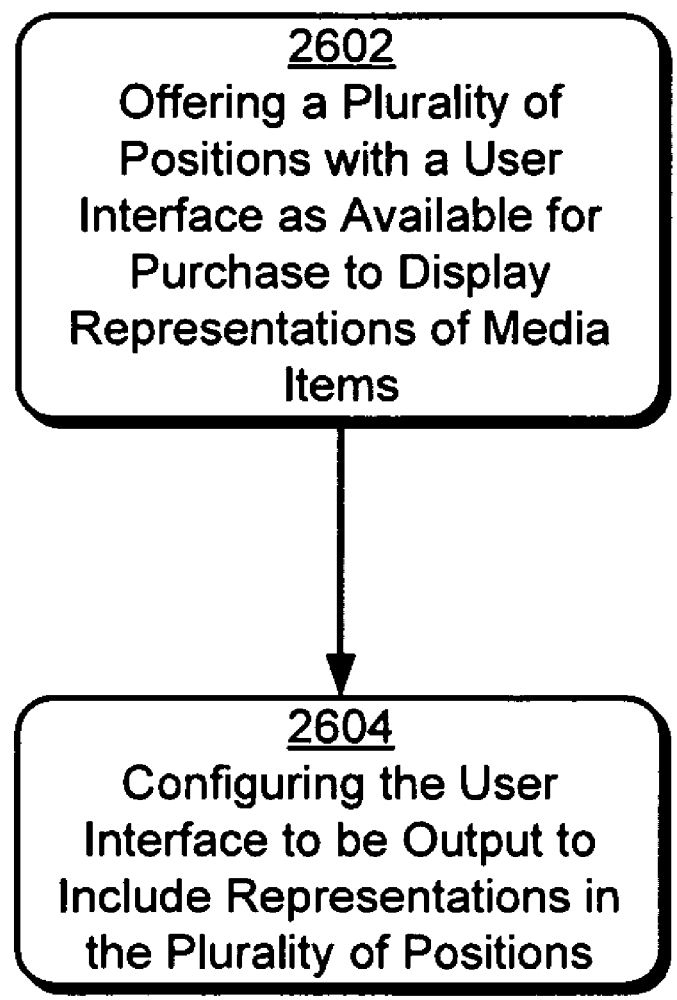
FIG. 26 is a flow diagram depicting a procedure in an exemplary implementation in which positions within a user interface are offered as available for purchase.

FIG. 26 depicts a procedure 2600 in an exemplary implementation in which positions within a user interface are offered as available for purchase. A plurality of positions within a user interface is offered as available for purchase to display representations of media items (block 2602). For example, a web site, advertisement, and so on may be output which indicates that positions are available within a media UI to access media items specified by the purchaser.

The positions may be configured in a variety of ways in a user interface. For example, one or more preferred positions may be provided on a primary display screen in a media UI, such as the "cinema now" representation 2006 in the media UI 2002 of FIG. 20. Additional representations may be accessible on a secondary display screen, such as through a representation "more movies" 2008 which indicates that additional movies are available via another screen. A variety of other examples are also contemplated.

The user interface is then configured to be output to include representations in the plurality of positioned (block 2604). For example, a first media provider may pay a premium to include representations of that provider's media items on the primary display screen, while other media providers pay a less amount to include representations on the secondary display screen. The representations may be configured to navigate to the represented media item, thereby aiding the user in accessing the desired media items.

Figure 27:
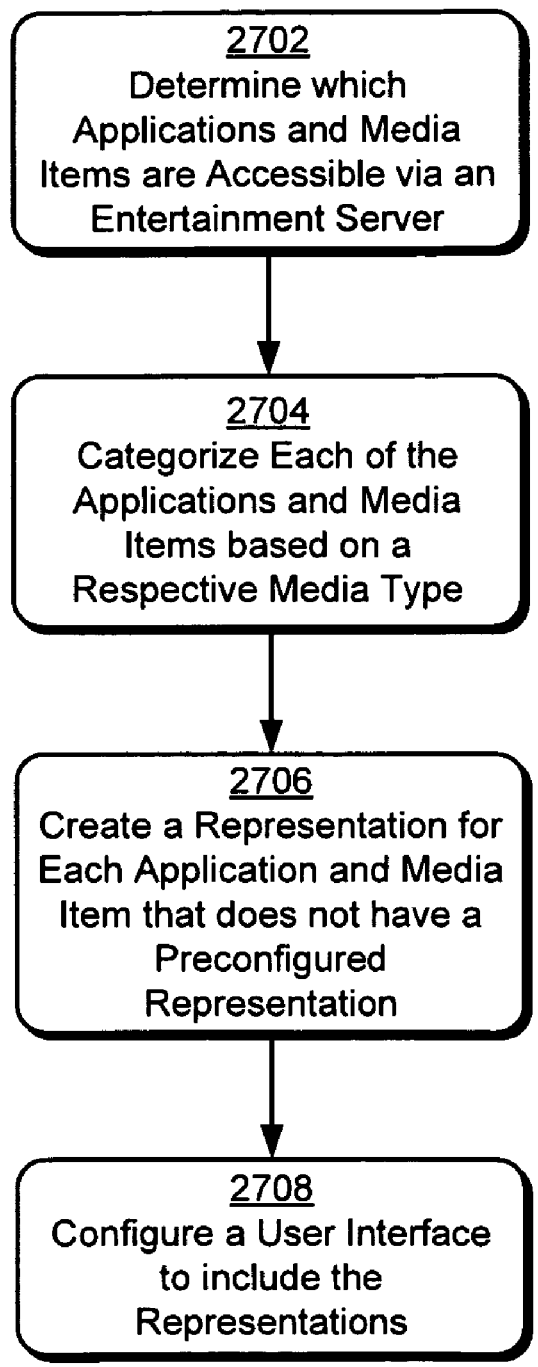
FIG. 27 is a flow diagram depicting a procedure in an exemplary implementation in which media items and applications are categorized for output in a media UI, and representations of applications and media items are created when not available.

FIG. 27 depicts a procedure 2700 in an exemplary implementation in which media items and applications are categorized for output in a media UI, and representations of applications and media items are created when not available. A determination is made as to which applications and media items are accessible via an entertainment server (block 2702).

This determination may be performed in a variety of ways, such as when the application and media items are installed on the entertainment server 112, upon installation of the media manager module 120 on the entertainment server 112, upon receipt of a request to perform the determination, and so on.

Each of the applications and media items are categorized based on a respective media type (block 2704). For example, applications and media items, when installed, may be assigned to a category for presentation in a categorized view on the start menu, e.g., FIGS. 19-20. Therefore, each category (e.g., music category, video category, so forth) includes corresponding types of media items and applications.

In some instances, however, a media item may not have a preconfigured (e.g., "ready-made") representation. In such an instance, a representation of each application and media item that does not have a preconfigured representation is created (block 2706). For instance, metadata of the media item may be utilized to supply relevant text in a representation, such as metadata of a title "Dub Side of the Moon" for the representation 1204 of FIG. 12. Accordingly, computer executable code (e.g., the media manager module 120) may be utilized to take metadata (e.g., a title) and put it into an album art representation as a replacement for a media item that does not have album art. The user interface may then be configured to include the representations (block 2708) when output.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computer-implemented method comprising:
outputting a user interface having a plurality of representations of media items horizontally arranged, one next to another, to form a horizontal list, the list being arranged in the user interface such that the plurality of representations are horizontally aligned to form one or more horizontal rows and vertically aligned to form a plurality of vertical columns, the user interface defining a center-locking region partially covering the horizontal list, wherein at least two or more of the plurality of columns are positioned within the center-locking region and at least one of the plurality of columns is positioned outside the center-locking region, wherein the center-locking region is a pre-determined area of the user interface that is less than a total area of the user interface, wherein a user is not able to move a focus of the user interface horizontally outside of the center-locking region, wherein the center-locking region is configured such that:
each representation is capable of receiving the focus and being selected when positioned within the center-locking region, and
each representation is disabled from being focused or selected in the user interface when positioned outside the center-locking region; and
navigating the plurality of representations of media items in the user interface by a user input to shift the focus to a different representation of the plurality of representations of media items having at least a first representation and a second representation, the navigation comprising:

in an event that horizontal navigation is attempted from the first representation within the center-locking region to the second representation outside the center-locking region:

scrolling, along a horizontal direction, causing a first column of the plurality of representations outside the center-locking region to be positioned within the center-locking region on a first side of the center-locking region and the scrolling causing a second column of the plurality of representations within the center-locking region to be positioned outside the center-locking region on a second side of the center-locking region, wherein the first column includes the second representation and the first column is positioned adjacent to the center-locking region before being positioned into the center-locking region; and shifting the focus from the first representation to the second representation when the second representation has entered the center-locking region, the shifting comprising:

de-highlighting the first representation to a normal presentation, wherein brightness and size of the normal presentation are equivalent to those of other representations that are displayed in the user interface; and highlighting, upon the second representation being positioned within the center-locking region, the second representation, the highlighting comprising brightening and enlarging the second representation while maintaining the other representations with the normal presentation in the user interface;

wherein the list is arranged in a horizontally-oriented carousel in the user interface, wherein a gap is provided between two particular columns of the plurality of columns, wherein one of the particular columns adjacent to the gap indicates a beginning of the list represented in the carousel, and the other particular column adjacent to the gap indicates an end of the list, and wherein when, as a result of the scrolling along the horizontal direction, the gap is located within the center-locking region, the user interface scrolls the list additionally to move the gap out of the center-locking region.

2. A method as described in claim 1, wherein the media items have types selected from the group consisting of:
a pay-per-view (PPV) movie;
a video-on-demand (VOD);
a song;
a photo;
streaming audio; and
a television program.

3. A method as described in claim 1, wherein:
a greater portion of the representations are oriented along a horizontal axis of the user interface than a portion of the representations that are oriented along a vertical axis of the user interface.

4. A method as described in claim 1, following the highlighting the second representation, navigating the focus from the second representation within the center-locking region to the first representation within the center-locking region by:
shifting, in the center-locking region, the focus from the second representation to the first representation without horizontally scrolling the plurality of columns, the shifting comprising:
de-highlighting the second representation to the normal presentation; and
highlighting the first representation, the highlighting comprising brightening and enlarging the first representation while maintaining the other representations with the normal presentation in the user interface.

5. A method as described in claim 1, further comprising executing an operating system that performs the outputting and the scrolling.

6. One or more computer-readable storage media comprising computer executable instructions that, when executed, direct a computer to implement a method as recited in claim 1.

7. One or more computer-readable storage media comprising computer executable instructions that, when executed, direct a computer to output a user interface having a gallery region and a pivot region:

the gallery region comprising:

a plurality of representations of media items that are horizontally arranged to form one or more horizontal carousels and vertically aligned to form a plurality of columns; and a center-locking region encompassing a portion of the plurality of representations such that at least two or more of the plurality of columns of representations of media items are positioned within the center-locking region and at least one of the plurality of columns is positioned outside the center-locking region, wherein the center-locking region is fixed to a pre-determined area of the gallery region that is less than a total area of the user interface, wherein a user is not able to move a focus of the user interface horizontally outside of the center-locking region, wherein the center-locking region is configured such that:

each representation is capable of receiving focus and being selected when positioned within the center-locking region; and each representation is disabled from being focused or selected in the user interface when positioned outside the center-locking region; and navigating the plurality of representations of media items in the gallery region of the user interface comprises:

scrolling, along a horizontal direction, to cause one of the plurality of representations outside the center-locking region to be positioned within the center-locking region when horizontal navigation is attempted from one of the two or more of the plurality of representations located within the center-locking region to one of the plurality of representations located outside the center-locking region, wherein the focus is shifted to the representation scrolled into the center-locking region; and the pivot region is positioned vertically adjacent to the gallery region and including a plurality of representations of features that are:

configured to sort the plurality of representations of media items in the gallery region; and arranged in at least one horizontal carousel accessible via vertical navigation from the gallery region.

8. One or more computer-readable storage media as described in claim 7, wherein:

at least one said representation of the gallery area is not included in the center-locking region and is positionable within the center-locking region upon scrolling of each said representation.

9. One or more computer-readable storage media as described in claim 7, wherein navigating the plurality of representations of features in the pivot region and sorting the plurality of representations of media items in the gallery region comprises:

shifting focus of the user interface between the gallery region and the pivot region via a vertical navigation command;

navigating each of the plurality of representations of features via a horizontal navigation command such that, as each one of the plurality of representations of features are being navigated, the plurality of representations of media items in the gallery region are automatically updated or adjusted in accordance with the one of the plurality of representations of features that is being navigated.

10. One or more computer-readable storage media as described in claim 7, wherein a gap provides a separation between two particular representations of the plurality of representations, the gap indicating a beginning and an end of a list represented by the plurality of representations, wherein the gap is configured such that when, as a result of horizontal scrolling, the gap is positioned in the center-locking region the user interface moves the gap out of the center-locking region by additional scrolling of the representations.

11. One or more computer-readable storage media as described in claim 7, wherein each said representation of the plurality of media items is configured to receive focus when positioned in the center-locking region such that metadata is displayable proximally to a respective said representation having the focus.

12. One or more computer-readable storage media comprising computer executable instructions that, when executed, direct a computer to output a user interface comprising:

a list comprising a plurality of representations of media items, the plurality of representations being horizontally arranged from left to right to form one or more horizontal axes in the user interface and vertically aligned to form a plurality of columns, the plurality of representations comprising at least a first representation and a second representation wherein the list is displayed as a horizontally-oriented carousel;

a gap vertically positioned in the user interface and indicating a beginning and an end of the list by separating a beginning column and an end column of the list; and a center-locking region encompassing a portion of the list, the center-locking region having a height sufficient to include all of the one or more horizontal axes in the user interface and having a width sufficient to include three or more columns of the plurality of columns of the list, the center-locking region being configured such that:

each representation is capable of receiving focus and being selected when positioned within the center-locking region; and each representation is disabled from being focused or selected in the user interface when positioned outside the center-locking region, wherein:

each representation located in the center-locking region is navigated when a focus is shifted to the representation from another representation; and when navigation through the plurality of representations of media items in the center-locking region causes the gap indicating the beginning column and the end column of the list to be positioned within the center-locking region, the gap separating a plurality of columns in the center-locking region into a first portion of columns including the beginning column of the list and a second portion of columns including the end column of the list, navigation further comprises moving the gap out of the center-locking region by:

navigating horizontally from the first representation to the second representation to cause the gap and the first portion of columns to be positioned outside the center-locking region on a first side of the center-locking region and to cause two or more columns that are positioned outside the center-locking region to be positioned within the center-locking region on a second side of the center-locking region when:

the first representation is located in the second portion of the columns within the center-locking region and the second representation is positioned outside the center-locking region and on the second side of the center-locking region; and the first representation and the second representation are horizontally aligned and positioned next to each other; or navigating horizontally from the first representation to the second representation to cause the gap and the second portion of columns that are located within the center-locking region to be positioned outside the center-locking region on the second side of the center-locking region and to cause two or more columns that are positioned outside the center-locking region to be positioned within the center-locking region on the first side of the center-locking region when:

the first representation is located in the second portion of the columns within the center-locking region and the second representation is positioned in the first portion of the columns within the center-locking region; and the first representation and the second representation are horizontally aligned but separated by the gap, such that, after the navigating:

the first representation and the gap are positioned outside the center-locking region and the second representation is still positioned within the center-locking region; and the first representation and the second representation maintain separation by the gap.

13. One or more computer-readable storage media as described in claim 12, wherein an amount of display area occupied by the gap indicating the beginning column and the end column of the list is less than the amount of display area occupied by any one of the plurality of said representations when displayed in the user interface.

14. One or more computer-readable storage media as described in claim 12, wherein an amount of display area occupied by the gap indicating the beginning column and the end column of the list is greater than an amount of display area disposed between other said representations in a respective said list that do not represent a beginning and an end of the list.

* * * * *

UNITED STATES PATENT AND TRADEMARK OFFICE
CERTIFICATE OF CORRECTION

PATENT NO. : 7,761,812 B2
APPLICATION NO. : 11/215315
DATED : July 20, 2010
INVENTOR(S) : Bojana Ostojic et al.

It is certified that error appears in the above-identified patent and that said Letters Patent is hereby corrected as shown below:

In column 22, line 39, in Claim 12, delete "representation" and insert -- representation, --, therefor.

In column 23, line 1, in Claim 12, before "navigation" insert -- the --.

Signed and Sealed this
Eighth Day of February, 2011

David J. Kappos
*Director of the United States Patent and Trademark Office*